Oct. 27, 1953  J. KOLBE  2,657,067
VEHICLE WITH INTERCUSHIONED BANKING AND VERTICAL
OSCILLATION SUSPENSION FOR THE SUPERSTRUCTURE
Filed April 19, 1947  14 Sheets-Sheet 7

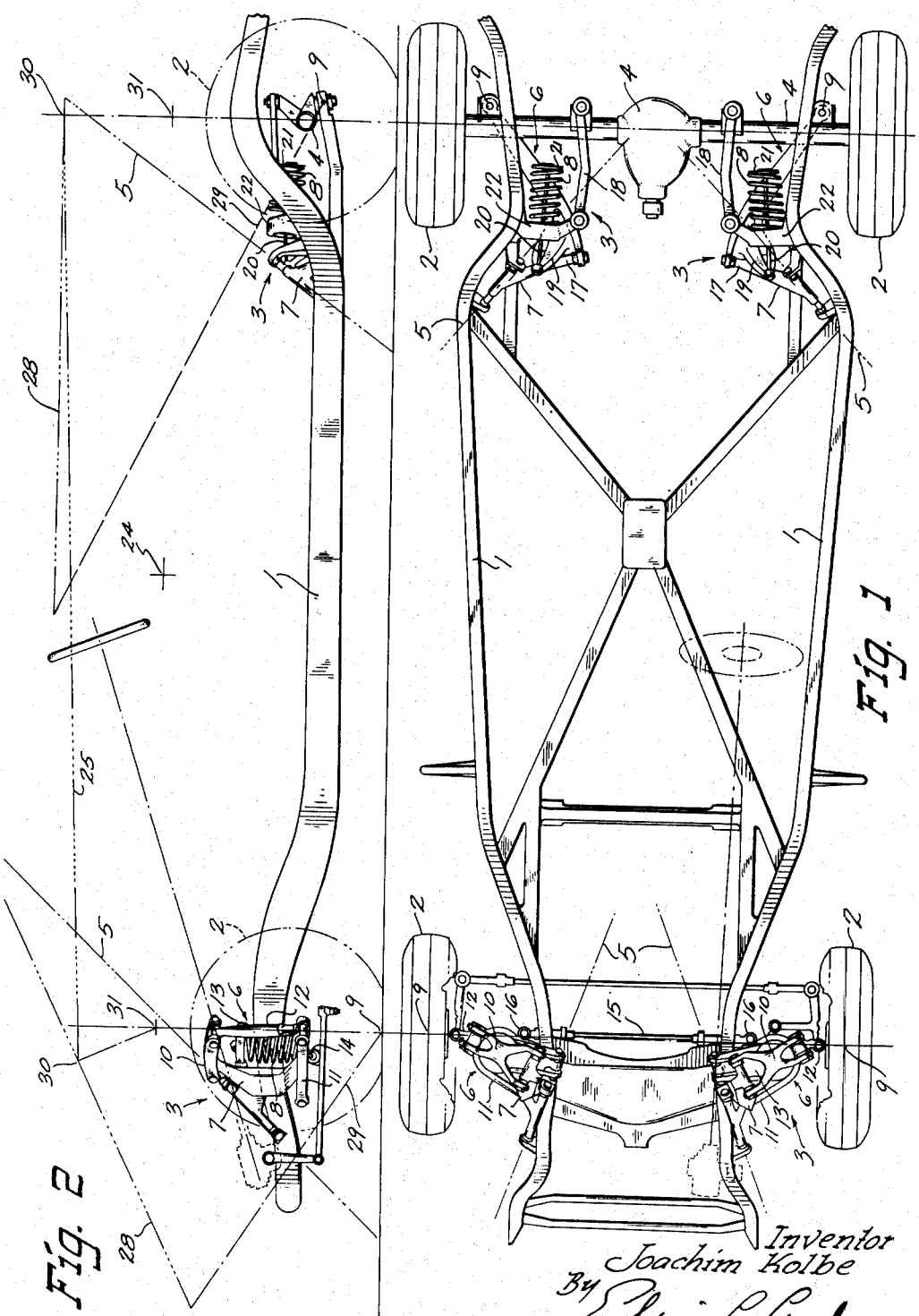

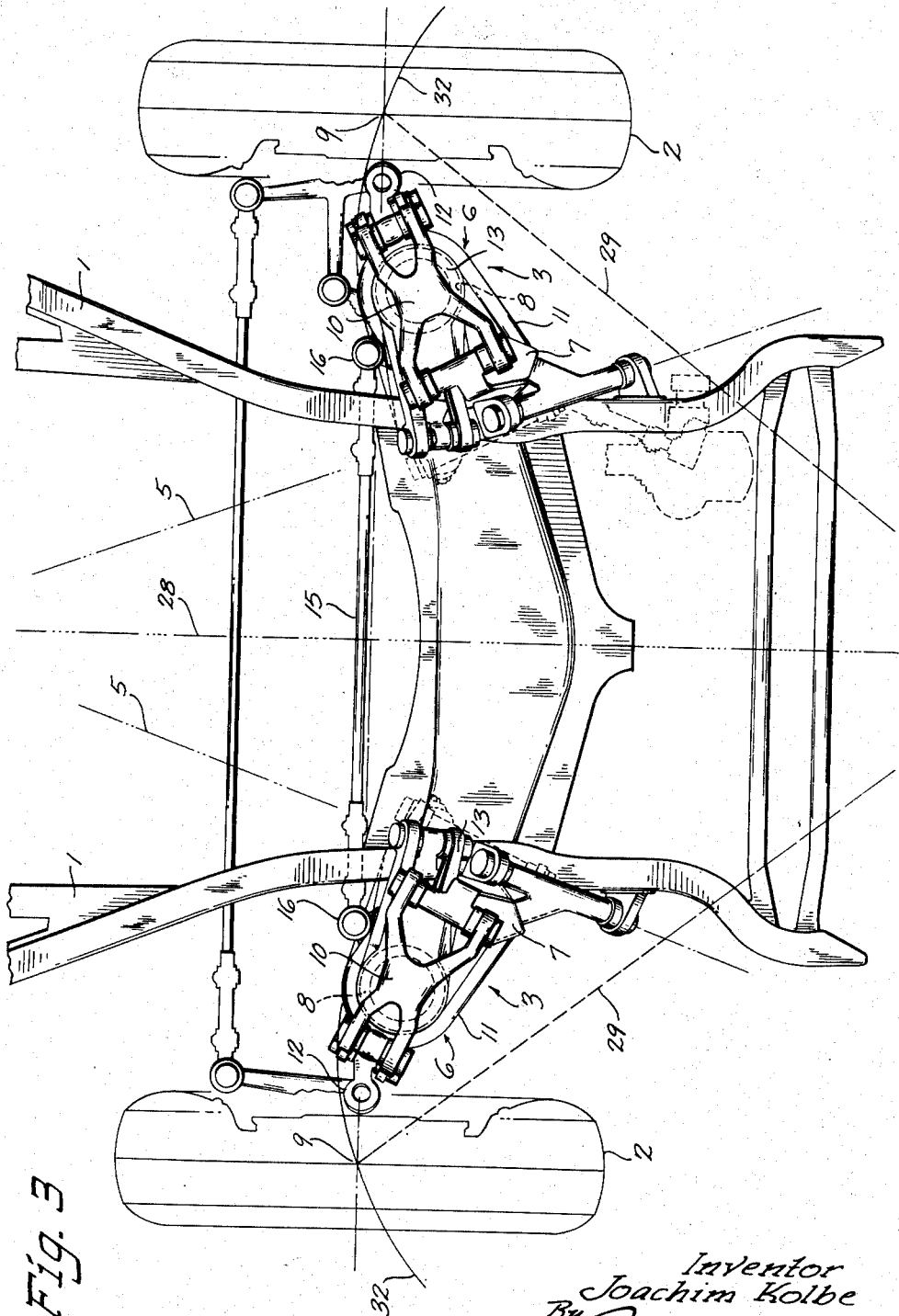

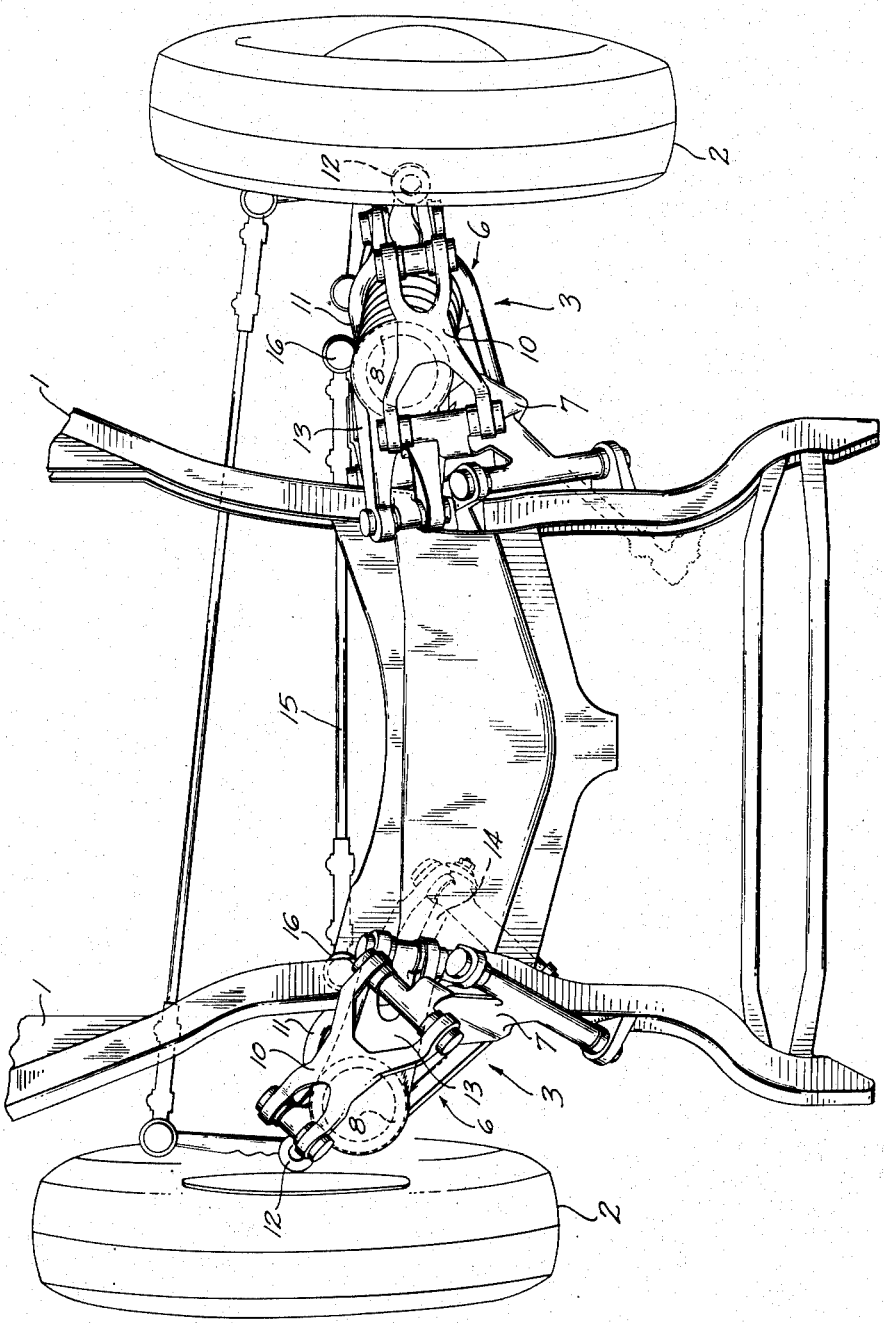

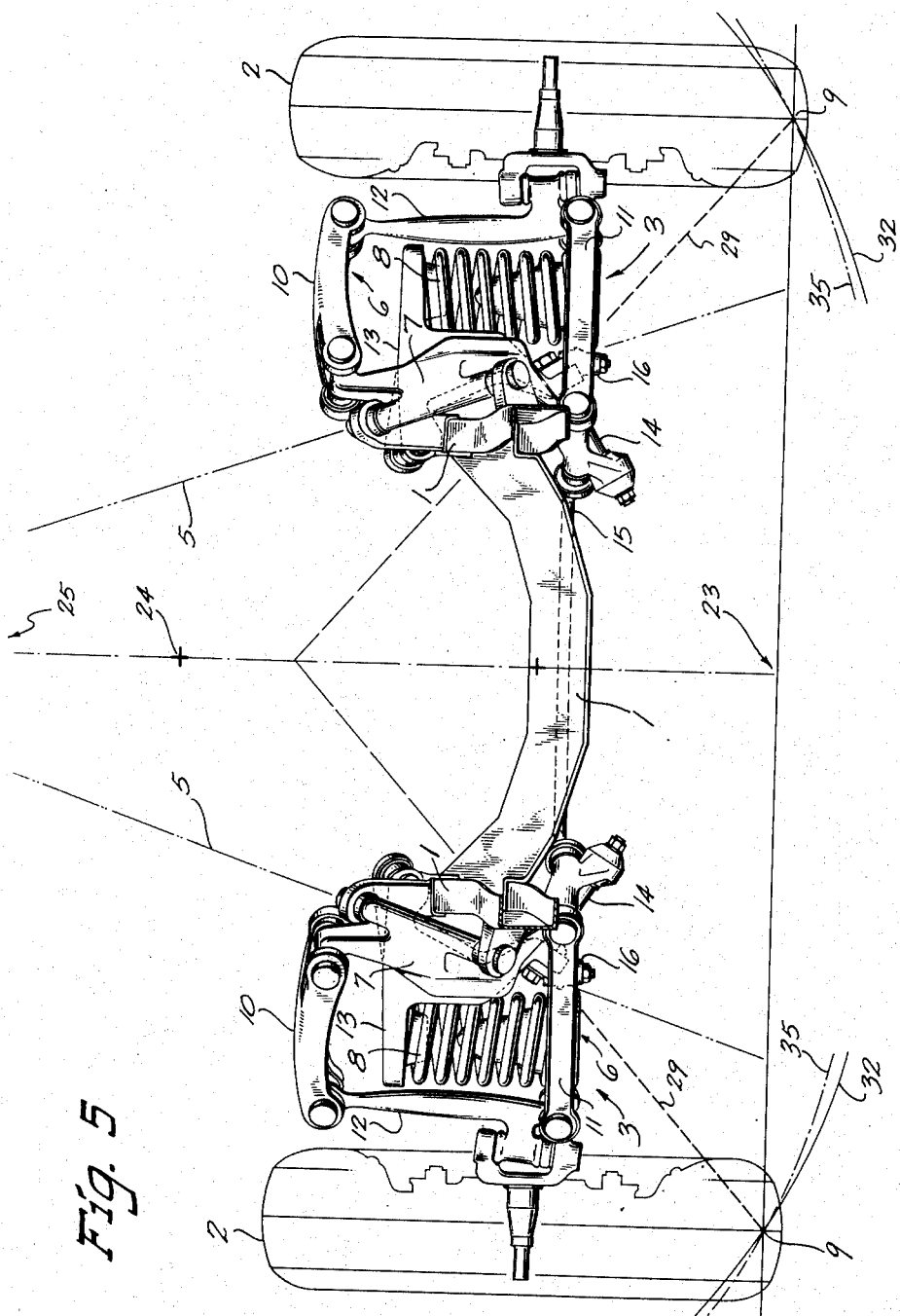

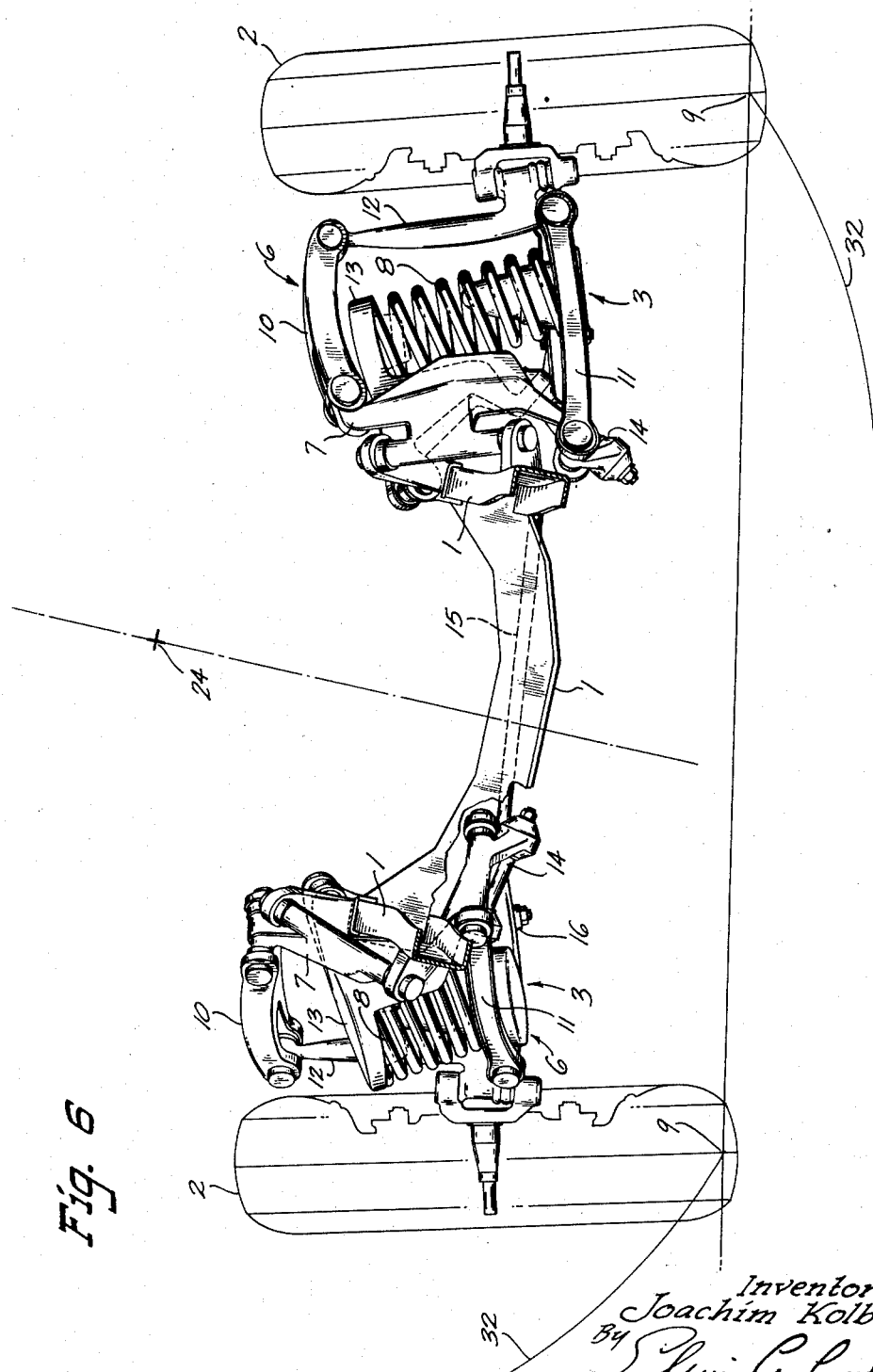

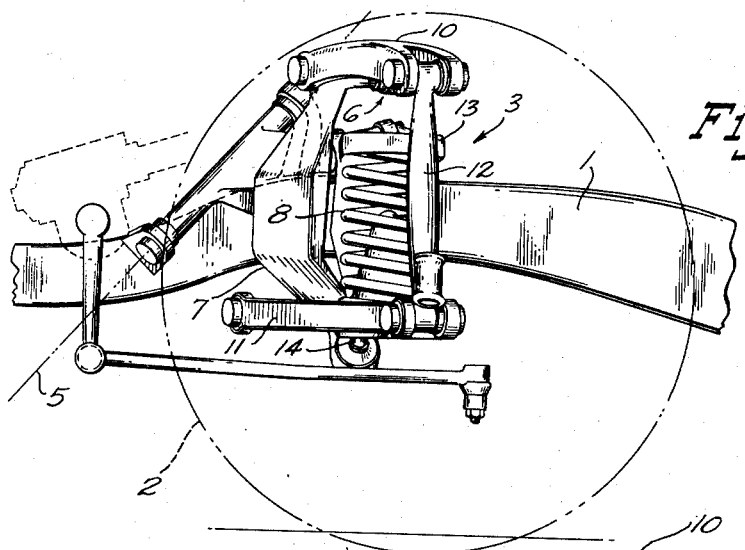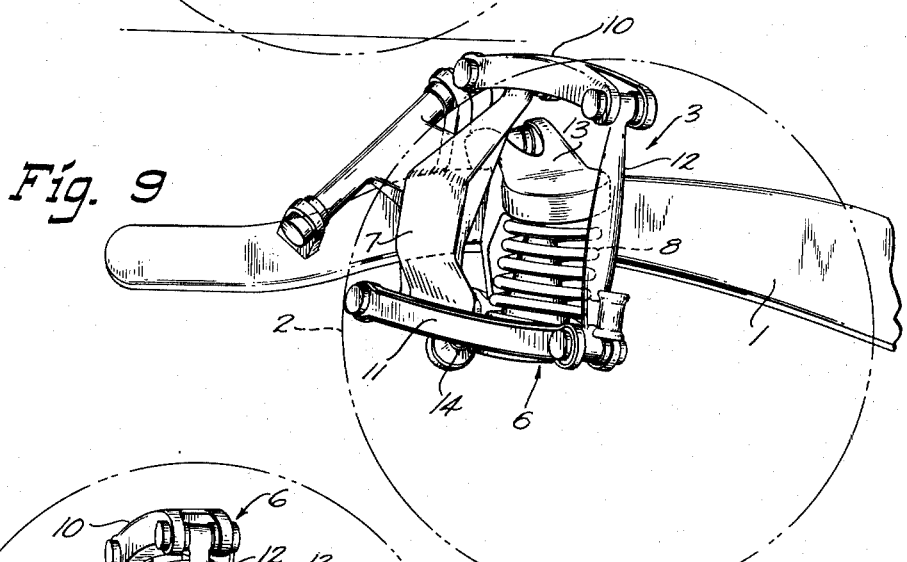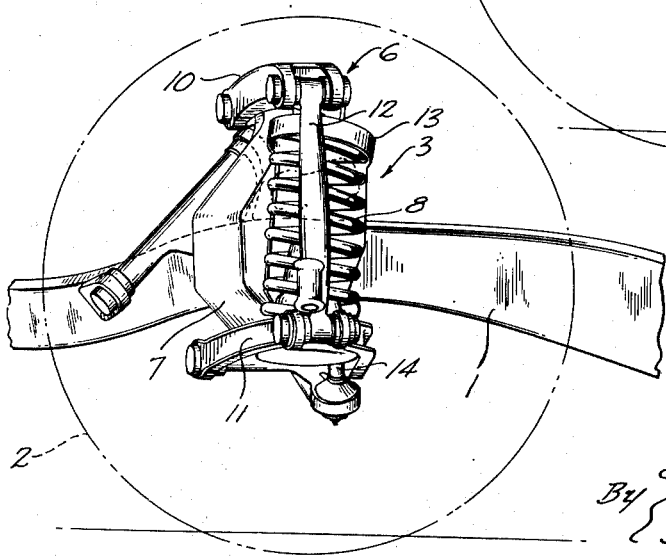

Inventor
Joachim Kolbe
By
Elvin A. Andrus
Attorney

Inventor
Joachim Kolbe
By
Attorney

Inventor
Joachim Kolbe

Oct. 27, 1953  J. KOLBE  2,657,067
VEHICLE WITH INTERCUSHIONED BANKING AND VERTICAL
OSCILLATION SUSPENSION FOR THE SUPERSTRUCTURE
Filed April 19, 1947  14 Sheets-Sheet 14

Inventor
Joachim Kolbe
By
Attorney

Patented Oct. 27, 1953

2,657,067

UNITED STATES PATENT OFFICE 2,657,067

VEHICLE WITH INTERCUSHIONED BANKING AND VERTICAL OSCILLATION SUSPENSION FOR THE SUPERSTRUCTURE

Joachim Kolbe, Milwaukee, Wis.

Application April 19, 1947, Serial No. 742,496
In Great Britain February 8, 1946

37 Claims. (Cl. 280—112)

This invention relates to vehicles wherein a superstructure is supported by cushion means, usually in the form of springs or torsion members with or without shock absorbers, upon sets of laterally spaced wheels. The invention is applicable to self-propelled motor vehicles and vehicle trailer combinations and to railway cars and articulated railway trains.

The providing for vertical wheel oscillations in supporting the superstructure and the cushioning of such oscillations has always presented a problem in a resultant tilting movement of the superstructure toward the outside on turns. The softer the cushion and the greater the oscillation provided, as in automobiles, the more severe is the tilting of the superstructure to the outside.

Where mountings are constructed for the purpose of banking the superstructure toward the inside of the turn a loss in the banking effect occurs due to a primary turning of the entire superstructure about a center of motion located below its center of mass resulting from the yielding of the mounting corresponding to the loading of the vertical oscillation springs on the outside of the turn and release of the springs on the inside.

Passenger automobile designers have been faced with the problem presented by the soft riding springs which result in a substantial lateral movement of the center of mass of the superstructure on turns and a substantial tilting component of the superstructure toward the outside in order to effect an equilibrium between the vertical supporting forces on the outer wheels and the shifted weight and centrifugal forces of the superstructure.

In outward tilting mountings this lateral movement of the superstructure is kept within bounds of safety and must be considered in designing the vehicle and particularly in relation to the height of the center of mass.

An additional lateral movement in former counter banking mountings is caused by a turning of the superstructure about a secondary center of motion located above the center of mass in a rotational direction toward an inward banking position and which either partially or wholly counteracts the turning of the superstructure about the primary center of motion located below the center of mass in a rotational direction toward an outward tilting position, as a result of a yielding of the springs.

The present invention utilizes the lateral shifting of the superstructure to effect a substantial operation of the vertical oscillation springs to cause counter-banking of the vehicle.

The present invention is applicable to all types of mountings in which the superstructure turns about a center of motion different from that effective upon vertical wheel oscillation, as the result of lateral forces upon the superstructure, and provides a means for effectively overcoming the tilting of the superstructure to the outside and the corresponding loss in inward banking effect. The invention is applicable to the use of any practical type of cushion means, including coil springs, leaf springs, torsion springs, hydraulic cushions and the like. It is applicable to both axle mountings and independent wheel mountings where the wheels are arranged in pairs or sets.

One of the principal objects of the invention is to load the outside cushion means by the turning of the superstructure about the secondary center of motion effective under the influence of lateral forces upon the superstructure, thereby restricting the turning of the superstructure about the primary center of motion effective under vertical wheel oscillation.

Another object of the invention is to substantially prevent the outward tilting movement of the superstructure on turns.

Another object is to substantially pre-absorb the vertical oscillation cushion means upon a turn and simultaneously obtain banking of the superstructure inwardly.

Another object is to provide a wider adaptation of design for inward banking mountings to accommodate space requirements and obtain varying desired banking effects.

Another object is to provide a leverage system for operation of the vertical oscillation cushion means by both vertical forces and lateral forces on the superstructure whereby the lateral forces operate to actuate the cushion means on turns in a manner to prevent outward tilting of the superstructure.

Another object is to provide a banking mounting for vehicles in which the cushion means are operated to obtain a substantially full banking effect at low speeds on a turn without loss of the effect upon increase in speed.

Another object of the invention is to provide a banking mounting for vehicles in which the motion of the center of mass of the superstructure is utilized to effect blocking of the outside cushion means on a turn and release of the inside cushion means without loss in banking by reason of the actuation of the cushion means.

Another object is to employ a relatively large lateral shifting between the lower part of the superstructure and the wheels on a turn to control the resistance to vertical oscillation between the wheels and superstructure.

Another object is to provide a banking mounting for vehicles employing banking arms and in which the movement of the effective point of road contact with each arm more nearly corresponds to an arc having the banking axis of the corresponding arm as a center during turn of the banking arm about the banking axis.

Another object is to provide a banking mounting for vehicles employing banking arms and in which the length of each banking arm is maintained more constant during operation of the arm on turns.

Another object is to maintain the oscillating part of each banking arm in substantially the same position relative to the connecting means between the part and the superstructure, regardless of variations of lateral pressure exerted thereon.

Another object is to provide a vehicle banking mounting in which the superstructure moves more rapidly to its final banked position relative to the wheels on a turn, thereby maintaining the superstructure more stable at all times.

Another object is to provide a vehicle banking mounting in which the banking leverage system for operating the cushion means and the vertical wheel oscillation leverage system for operating the cushion means are substantially independent of each other so that their relative action and timing may be controlled as desired.

Another object is to provide a banking mounting for vehicles in which the leverage ratio for operating the springs provides a greater resistance to the outward tilting of the superstructure than to the inward banking of the superstructure, whereby the superstructure moves readily in the direction of least resistance.

Another object is to provide a vehicle mounting in which the superstructure is more stable against one-sided loading thereof.

Another object is to provide a vehicle mounting in which through improved spring operation an inward banking movement is obtained with a secondary center of motion that is higher for a given degree of banking at a given speed and turn.

Another object is to provide a vehicle mounting in which the vertical oscillation cushion means may be more soft without increasing the danger of outward tilting of the superstructure.

Another object is to provide a vehicle mounting in which the vertical oscillation springs may be actuated more fully to assist in obtaining a given inward banking movement, thereby making it possible to utilize mountings in which the geometry would not be effective alone to obtain the given inward banking movement.

Another object is to arrange resilient means between the superstructure and wheel suspension means in such a manner that lateral forces exerted on the superstructure will cause the resilient means to take their natural shape in accordance with the pressure exerted without influencing the position of the superstructure achieved by the novel suspension means.

Other objects and advantages of the invention are set forth hereinafter.

The invention is illustrated in the accompanying drawings in which:

Figure 1 is a top plan view of the chassis and mounting of an automobile embodying the invention;

Fig. 2 is a side elevation of the structure of Fig. 1;

Fig. 3 is an enlarged top plan view of the front mounting for the vehicle of Fig. 1 with the superstructure in upright unbanked position;

Fig. 4 is a view similar to Fig. 3 showing the superstructure in an inwardly banked position, as on a turn;

Fig. 5 is a front end elevation of the vehicle of Fig. 1 with the superstructure in upright unbanked position;

Fig. 6 is a view similar to Fig. 5 with the superstructure in inward banked position, as on a turn;

Fig. 7 is a side elevation of the front mounting of Fig. 1 with the near wheel removed;

Fig. 8 is a view similar to Fig. 7 showing the mounting on the inside of a curve with the superstructure in banked position;

Fig. 9 is a view similar to Fig. 7 showing the mounting on the outside of a curve with the superstructure in banked position;

Figure 10:
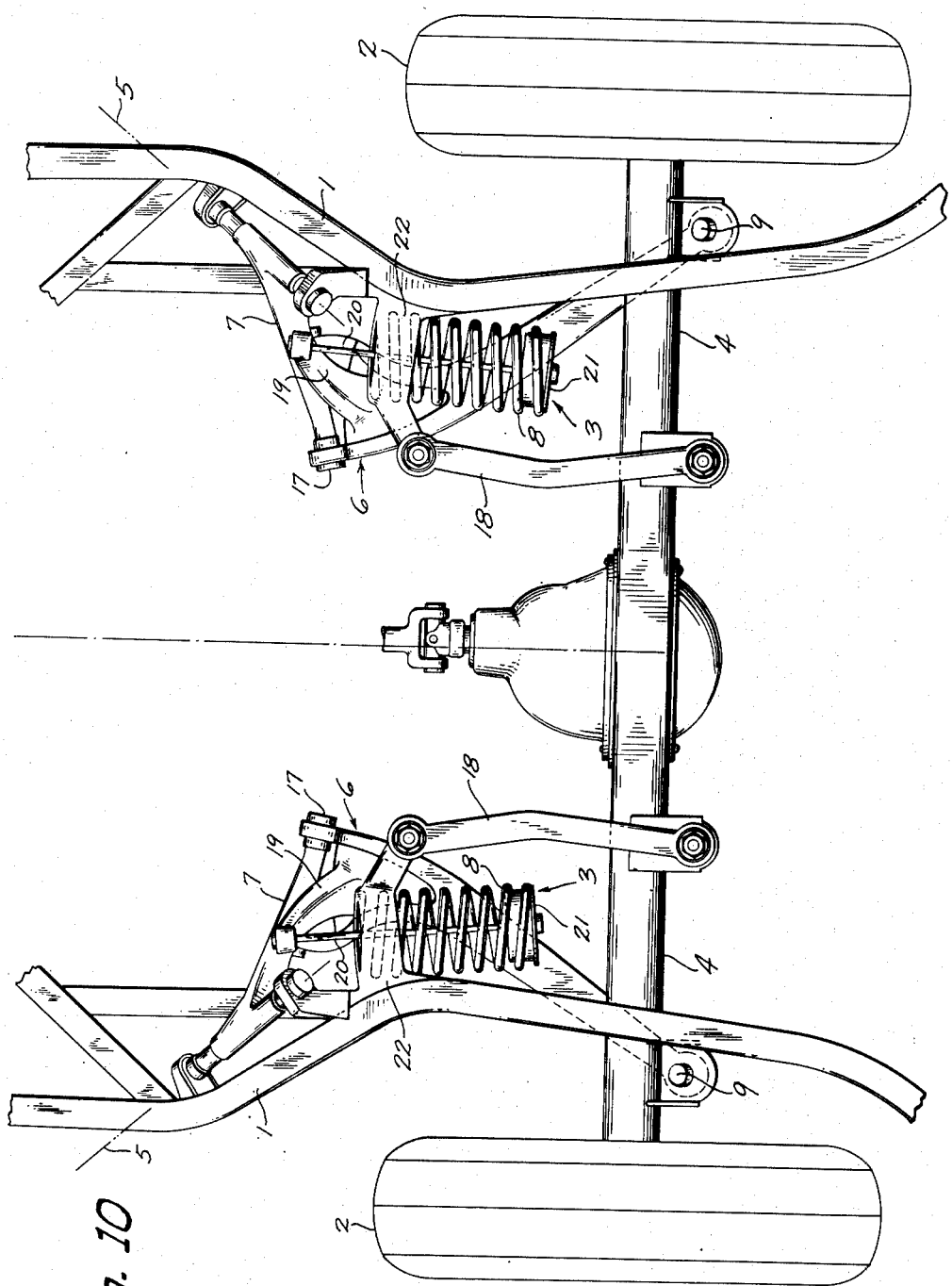
Fig. 10 is an enlarged top plan view of the rear mounting for the vehicle of Fig. 1 with the superstructure in upright unbanked position.
Figure 11:
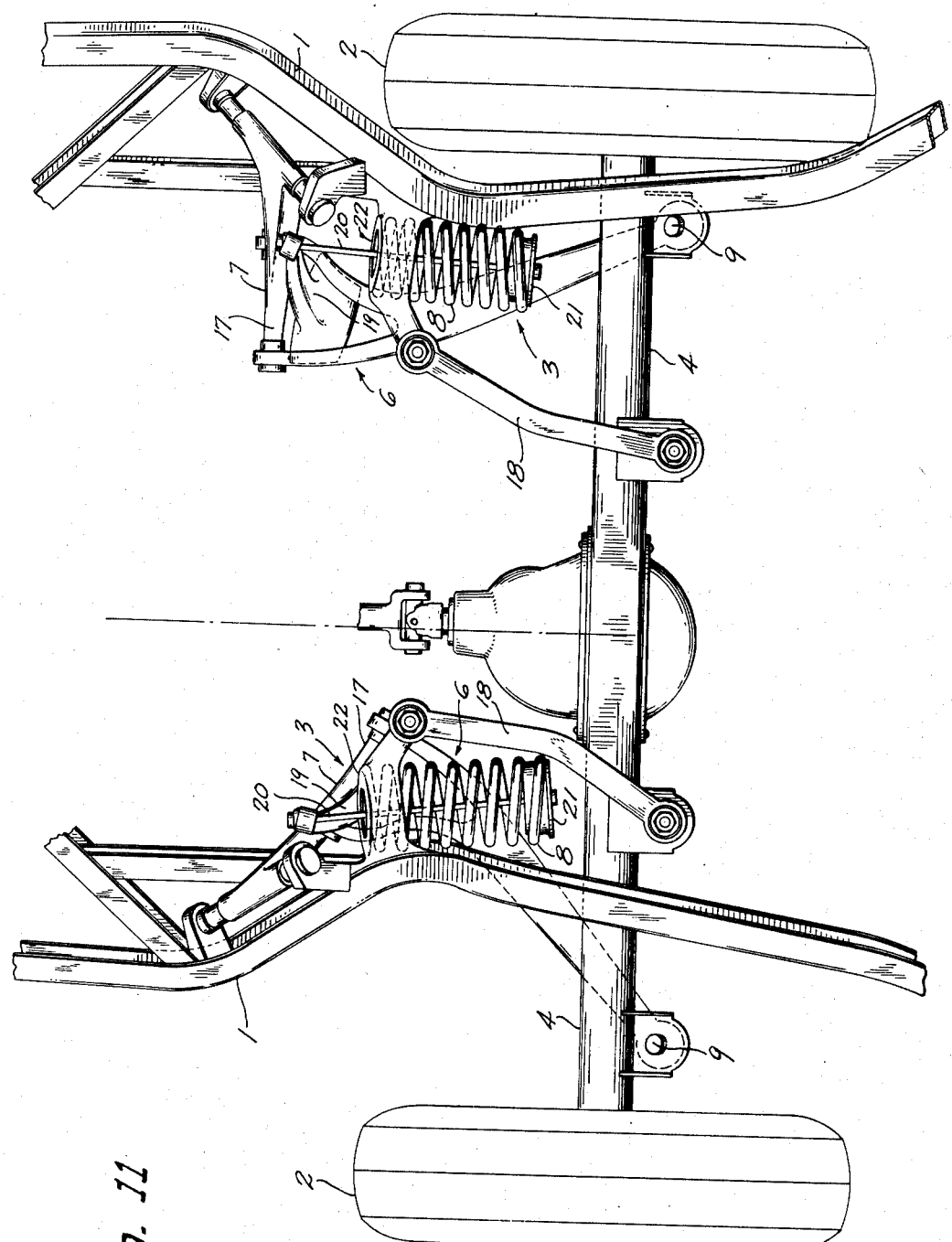
Fig. 11 is a view similar to Fig. 10 showing the superstructure in an inwardly banked position, as on a turn.
Figure 12:
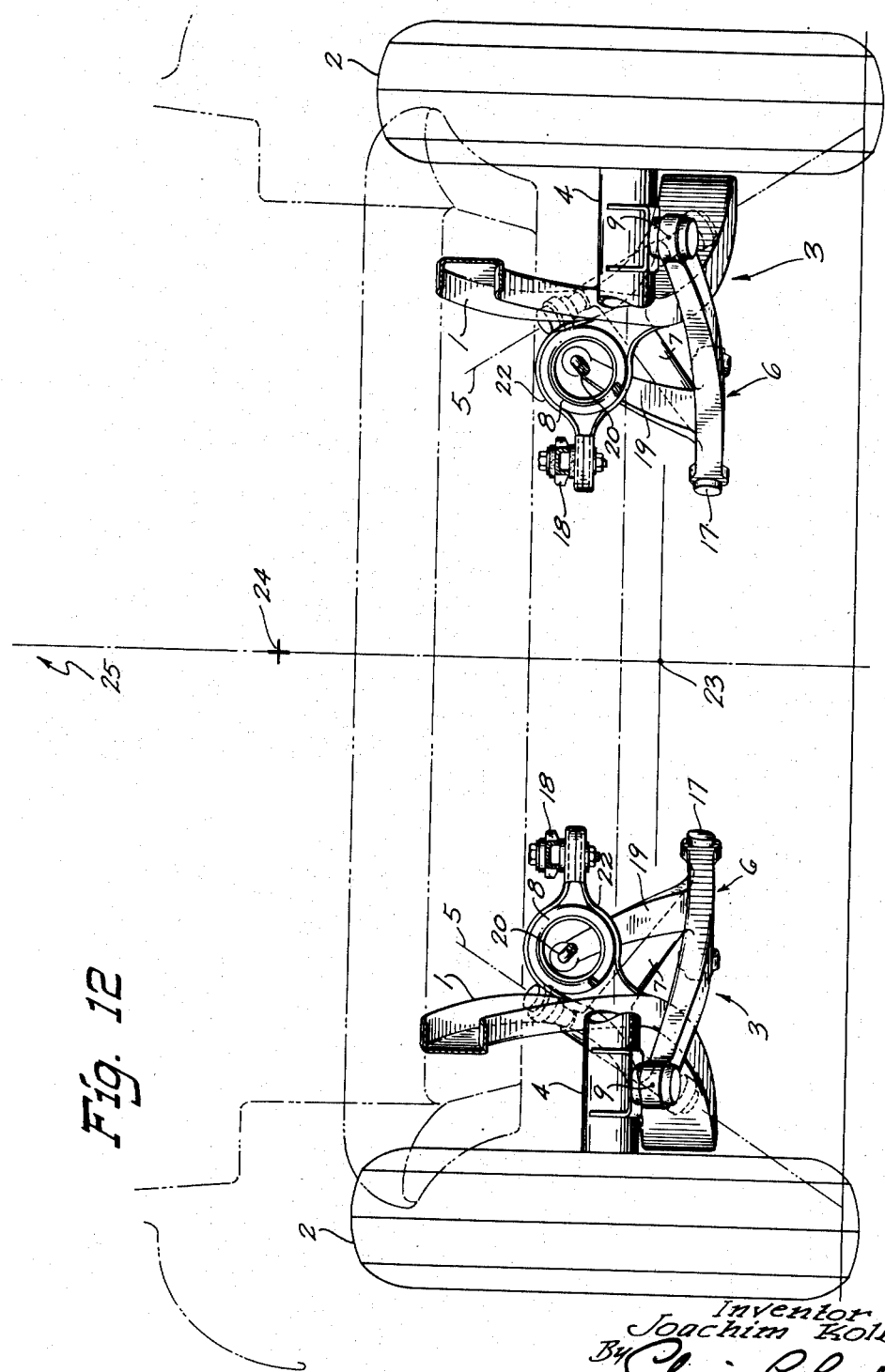
Fig. 12 is an enlarged rear end elevation of the vehicle of Fig. 1 with the superstructure in upright unbanked position and the rear axle broken away to show the mounting.
Figure 13:
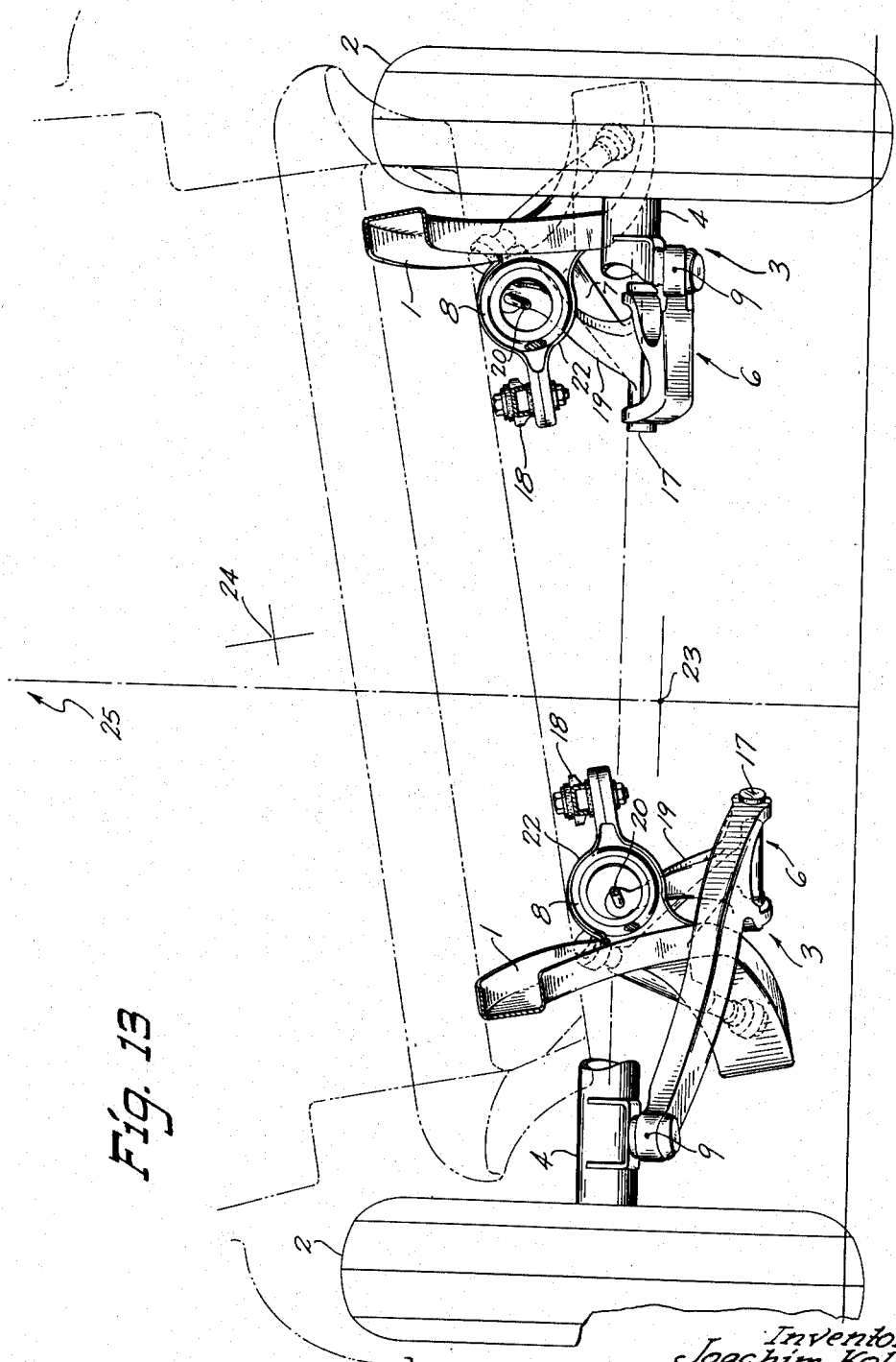
Fig. 13 is a view similar to Fig. 12 with the superstructure in inward banked position as on the same turn as for Fig. 11.

The drawings illustrate the invention as applied to a mounting employing skew banking arms similar to those set forth in the copending application of the present inventior, Serial No. 724,062, filed January 24, 1947, for United States Letters Patent on a counter-banking vehicle.

Similar banking structures to which the invention is shown as applied are illustrated in the following earlier filed copending applications: Serial No. 522,269, filed February 14, 1944, for Motor Vehicle, now abandoned in favor of this application and of application Serial No. 724,062; Serial No. 635,268, filed December 15, 1945, for Vehicle, now abandoned in favor of this application and application Serial No. 724,062; Serial No. 638,210, filed December 29, 1945, for Vehicle, now abandoned in favor of applications Serial No. 14,480, filed March 12, 1948, now Patent No. 2,580,559, dated Jan. 1, 1952, and Serial No. 228,452, filed May 26, 1951; Serial No. 641,707, filed January 17, 1946, for Vehicle, now abandoned in favor of applications Serial No. 787,499, filed November 22, 1947, now Patent No. 2,580,558, dated Jan. 1, 1952; Serial No. 769,161, filed August 18, 1947, and Serial No. 771,717, filed September 2, 1947, now Patent No. 2,580,557, dated Jan. 1, 1952; Serial No. 642,263, filed January 19, 1946, for Vehicle, now abandoned in favor of application Serial No. 630, filed January 5, 1948, now Patent No. 2,581,030, dated Jan. 1, 1952; Serial No. 642,264, filed January 19, 1946, for Vehicle, now abandoned in favor of application Serial No. 23,066, filed April 24, 1948; and Serial No. 724,062, filed January 24, 1947, for Vehicle, now Patent No. 2,576,686, granted November 27, 1951. The present invention is illustrated in several of the above copending applications and allowed claims in said first filed application, Serial No. 522,269, filed February 14, 1944, and in said second filed application, Serial No. 635,268, filed December 15, 1945, have been transferred to the present application.

The vehicle of the invention comprises the superstructure 1 which may be made up of the chassis frame, engine, body and load of a passenger automobile or other vehicle, and the supporting wheels 2 which support the superstructure on the road or track.

The wheels 2 are arranged in one or more sets, each set constituting one or more pairs, with the wheels of each pair disposed in axial alignment on opposite sides of the superstructure. In a passenger automobile, such as that illustrated, there are two sets of wheels, one at the front end of the superstructure and the other at the rear end of the superstructure, and each set comprises a single pair of wheels.

The wheels 2 are secured to the superstructure 1 by suitable wheel carriers 3 which provide for vertical oscillation of each wheel relative to the superstructure for the purpose of giving a soft ride to the latter on rough roads.

The wheel carriers 3 are arranged in pairs similar to the wheels, and one or more pairs may be employed for connecting each set of wheels 2 to the superstructure. In the construction illustrated there is a single pair of wheel carriers 3 for each pair of wheels.

The carriers 3 may constitute independent wheel suspensions or they may suspend the wheels by means of a rigid axle. In the construction illustrated the front steerable wheels 2 are independently suspended by means of the corresponding carriers 3, and the rear drive wheels are rigidly held by the rear axle housing 4 which is in turn connected to the outer ends of the wheel carriers 3.

In its broader aspect the invention includes the employment of almost any practical type of wheel carrier construction suitable for the particular type of vehicle and which provides the centers of motion for the superstructure referred to above. In its more preferred specific aspect the invention employs a type of wheel carrier construction which will produce an inward banking of the superstructure upon turns.

The specific wheel carriers 3 illustrated in Figs. 1 to 16 are incorporated in mountings of the banking arm type set forth in the copending application, Serial No. 724,062, referred to above.

Figure 18:
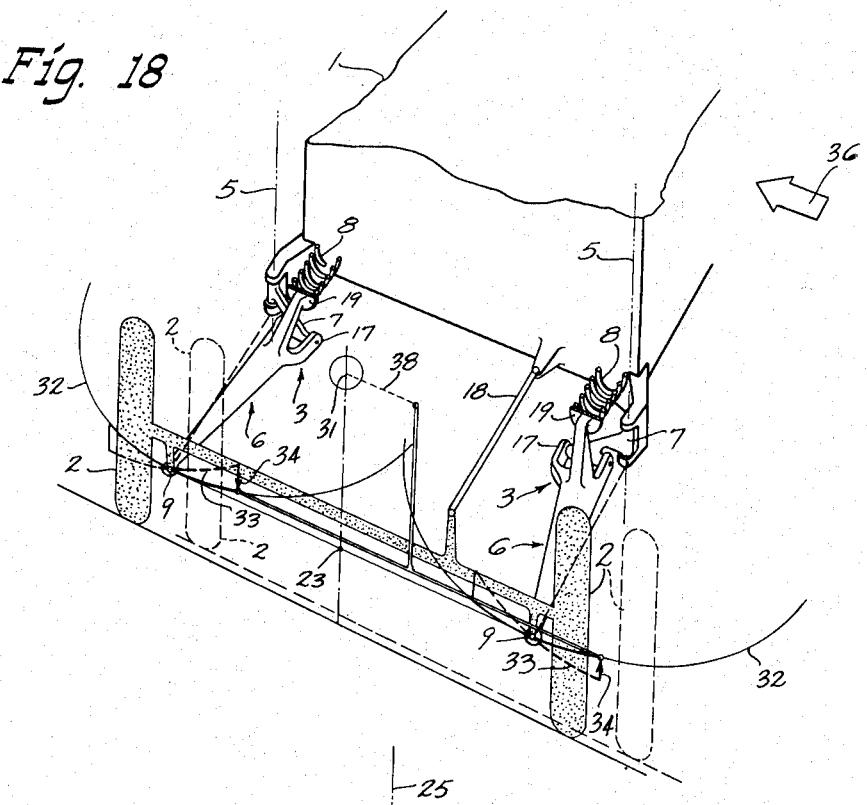
Fig. 18 is a view similar to Fig. 16 showing the application of the invention to a modified construction.

As defined in said copending application, a vehicle banking arm as employed in this specification and in the claims is that part of the supporting structure of a counter-banking vehicle constituting one of at least a pair of interconnected supports between the superstructure and either the road or a rigid axle, comprising a universally movable joint at one end guided in its banking movement relative to the opposite end of the arm structure in effect by an inclined hinge at said opposite end to thereby move along a predetermined path whereby the plane of the arm containing the center of the universally movable joint and the inclined hinge axis intersects the median vertical longitudinal plane of the superstructure in static position in a line passing substantially above the center of gravity of that part of the superstructure supported by said pair of supports at the point of intersection of the line with a transverse vertical plane containing the universally movable joints of the pair of supports, said banking arm structure constituting also the vertical oscillation mechanism for guiding the superstructure for vertical oscillation upon the road or rigid axle, and said universally movable joint being furnished by the tire to road contact in the case of an independent wheel suspension. The invention is also shown in Fig. 18 as applied to a mounting in which the banking action is based solely on spring operation, and also in Fig. 19 to link mountings generally similar to that illustrated in U. S. Patent No. 2,234,676, granted to the present inventor on March 11, 1941, and which produces an inward banking action for the superstructure upon turns.

The banking arms illustrated in Figs. 1 to 16 are pivoted to the superstructure 1 in a manner providing a skew banking axis 5 for each banking arm and about which the banking arm turns relative to the superstructure during lateral movement of the latter.

Each banking arm contains within itself a vertical oscillation structure 6 to enable the corresponding wheel to oscillate vertically relative to the superstructure. For this purpose the structure 6 shown, is pivoted to a support member 7 interposed between it and the superstructure and which constitutes the inner end of the banking arm.

A cushion means 8, shown in the form of a coil spring, is disposed to be operated both by the vertical oscillation of the corresponding wheel and by a turn of the banking arm about its axis 5 in a manner so that a turn at the banking axis interferes with the vertical wheel oscillation. For this purpose the spring 8 is disposed between the oscillation structure 6 and the superstructure 1 or a lever member operated thereby and is actuated by a different leverage ratio for the oscillation than for the banking action.

The outer end of each banking arm comprises the effective road contact point 9, which for an independent wheel suspension such as that illustrated at the front end is the center of contact between the tire of wheel 2 and the road, and for a rigid axle structure such as that illustrated at the rear end is the center of the ball and socket connection between the oscillating structure 6 and the axle housing 4. The banking arm for an independently suspended wheel includes both the wheel 2 and carrier 3. The banking arm for a rigid axle suspension generally includes only the carrier 3.

Each oscillation structure 6 for the front end banking arms, illustrated in the drawings, comprises a pair of vertically superimposed substantially parallel and horizontal arms 10 and 11, each horizontally pivoted for vertical oscillation at its outer end to the kingpin support 12 and at its inner end to the support member 7.

The coil spring 8 is supported on the lower arm 11 and serves to control the vertical oscillation of wheel 2 relative to the superstructure, as described hereinafter.

The upper end of spring 8 supports the superstructure by means of a bell crank lever 13 pivoted to the superstructure and having its lower end connected to the support 7 by means of a shackle 14 at a predetermined distance from banking axis 5.

The wheel carriers 3 for the front banking arms constitute independent suspension units for the corresponding wheels, and the corresponding banking arms are interconnected to operate in unison by any suitable means such as the suspension tie rod 15 shown as secured to the lower arms 11 by ball and socket joints 16.

Each oscillation structure 6 for the rear end banking arms, illustrated in the drawings, comprises a substantially horizontal oscillation arm 6 pivoted at its outer end to the axle housing 4 by a ball and socket joint at the effective road contact point 9, and at its inner end to the support 7 by a substantially horizontal hinge 17 for vertical oscillation of housing 4 relative to the superstructure. An upper suspension rod 18 is pivoted at one end to superstructure 1 and at the other end to rear axle housing 4, and cooperates with the oscillation structure arm 6 to maintain the rear axle housing substantially upright at all times. Each rear oscillating arm 6 has a vertically extending bell crank arm 19 disposed to actuate the horizontally arranged spring 8 both for vertical oscillation and banking action. For this purpose the arm 19 has a rod 20 secured thereto and extending longitudinally through the center of the coil spring, and which actuates the free end of the spring by means of a cap plate 21 secured to the rod. The fixed end of the spring is secured by a suitable bracket 22 on the superstructure 1.

The vehicle embodies two centers of motion for the superstructure, the primary center of motion 23 lying in a zone extending longitudinally of the vehicle below the center of gravity 24 of the superstructure, and the secondary center of motion 25 lying in a zone extending longitudinally of the vehicle above the center of gravity 24.

The primary center of motion 23 exists in all cushion mounted vehicles, and constitutes the center about which the superstructure tends to rotate in tilting toward the outside of a turn in the road. In general the primary center of motion may be considered as located midway between the effective road contact points 9 for each set of wheel carriers.

The secondary center of motion 25 exists in all vehicles in which the superstructure is free to bank inwardly, and constitutes the center about which the superstructure tends to rotate in banking inwardly on a turn in the road.

The rotational movement of the superstructure about either center of motion for a given lateral movement of the center of gravity tends to counteract the rotational movement of the superstructure about the other center of motion.

The vertical oscillation cushion means serve to resist rotational movement of the superstructure about the primary center of motion 23, and the stiffer the vertical oscillation springs are, the less the turn at the primary center of motion and the less outward tilting of the superstructure will result.

The turn at the secondary center of motion to be resisted either by gravity or by separate springs which control the inward banking action. Such springs may be in the form of the coil springs 26 referred to in copending application Serial No. 724,062, identified above.

In accordance with the present invention the vertical oscillation cushion means 8 are disposed to be operated directly both by the turn at the primary center of motion 23 and by the turn at the secondary center of motion 25. In a banking mounting such as that illustrated, the present invention employs the vertical oscillation cushion means 8 to control the banking obtained by the turn at the banking axis in the case of banking arms, or the turn of the links in the case of link mountings. In a mounting in which the banking action is based solely upon spring operation, the vertical oscillation cushion means are employed in such a manner as to block or absorb the spring on the outside of a turn in response to lateral movement of the superstructure, thereby preventing any substantial tilting of the superstructure toward the outside, and if desired even to lift the superstructure on the outside of the turn.

Any of the banking mountings illustrated are interchangeable in principle and have corresponding spring action. In each, the actuation of the springs in response to a turn at either center of motion as the result of a lateral movement of the superstructure reduces the spring actuation available for vertical oscillation of the wheels on the side toward which the superstructure moves, and increases the spring actuation available for vertical oscillation of the wheels on the opposite side. In either mounting it is possible to design the mounting to eliminate the turn about the primary center of motion or to provide a combination of turns about both centers of motion giving any desired resultant effect.

The action of the spring in response to lateral movement of the center of mass of the superstructure about the secondary center of motion tends to maintain the total length of the effective banking arm substantially constant, or provides a desired control thereof.

In the front set of banking arms shown in Figs. 1 to 9, the springs 8 are compressed from opposite directions for the two actions named. The vertical oscillation of each front wheel 2 relative to the superstructure 1 acts upon the corresponding spring 8 from the bottom by means of the lower arm 11, and an upward movement of the wheel compresses the spring while a downward movement of the wheel tends to decompress the spring. The lateral movement of the superstructure 1 relative to front wheels 2 provides a lever action upon the springs 8 from the top by means of the pivoted bell crank levers 13 which are operated by shackles 14 upon a turn at the banking axes 5, and a movement of the superstructure toward either side of the vehicle tends to compress the spring 8 on that side without a corresponding lowering of the superstructure thereon and to decompress the opposite spring 8 without a corresponding raising of the superstructure thereon.

Figure 14:
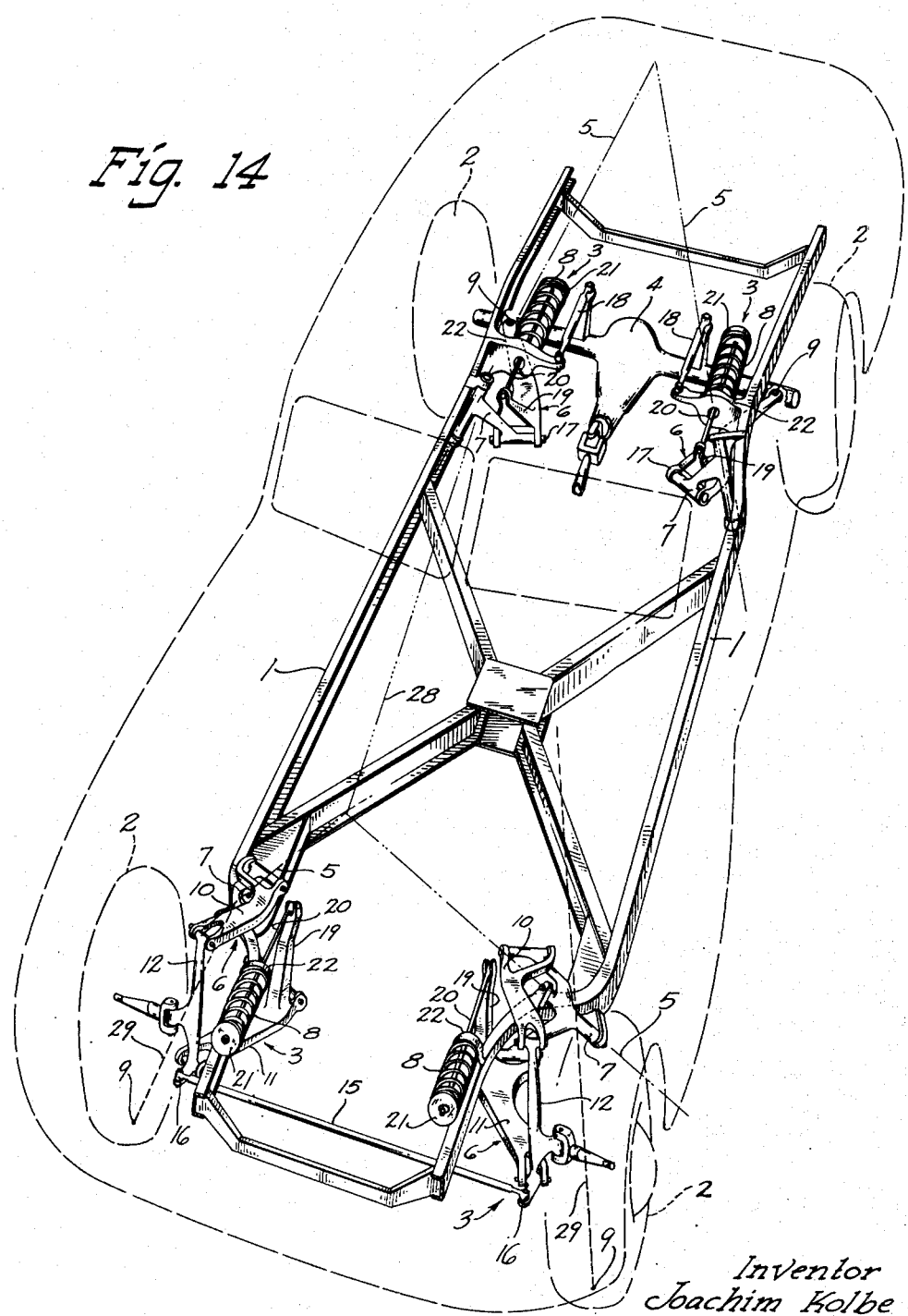
Fig. 14 is a perspective view of a vehicle mounting in which the rear mounting is the same as for Fig. 1, and the front mounting is similar to the rear mounting, with the superstructure in upright unbanked position.
Figure 15:
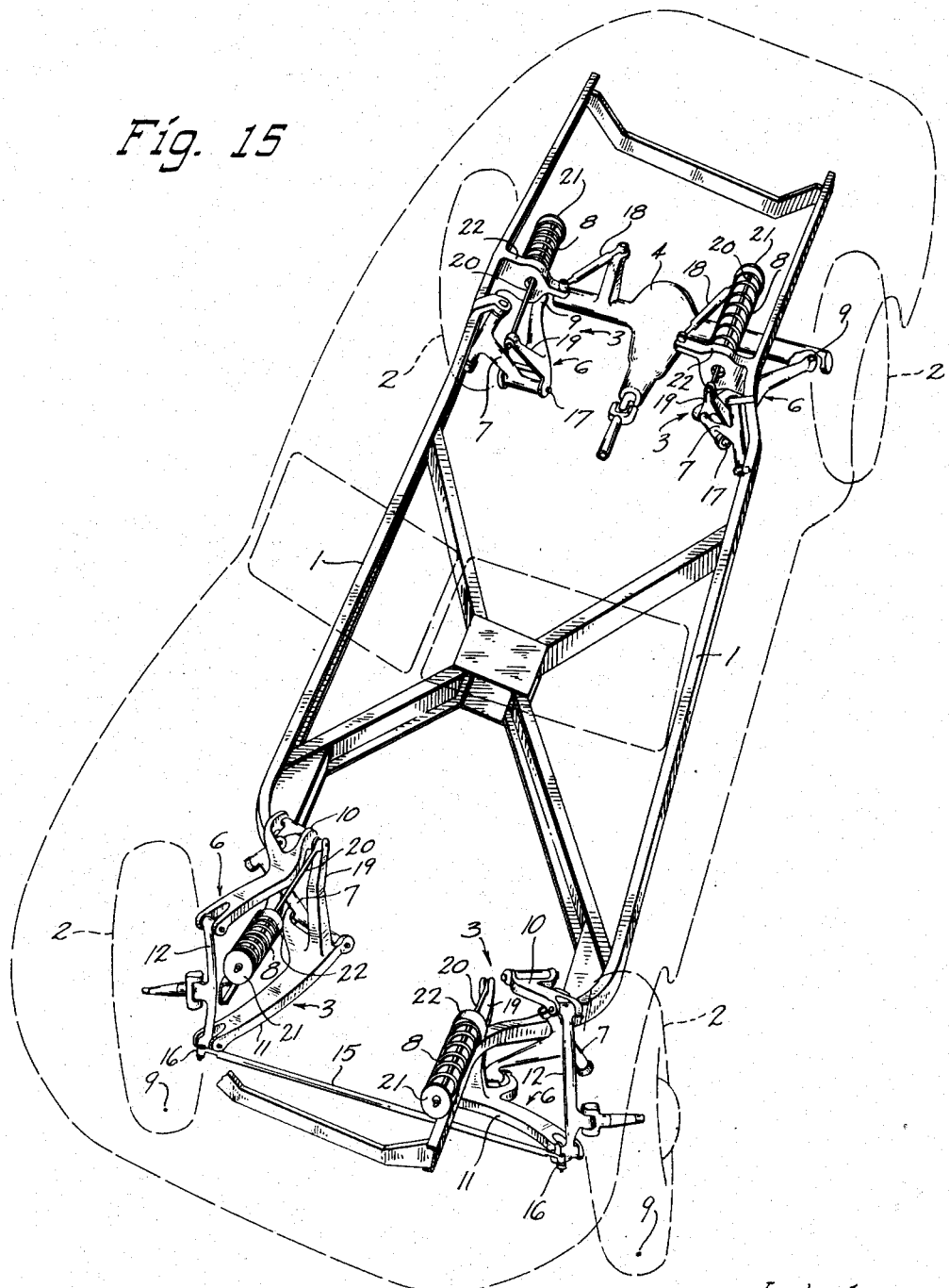
Fig. 15 is a view similar to Fig. 14 showing the superstructure in an inwardly banked position, as on a turn.
Figure 16:
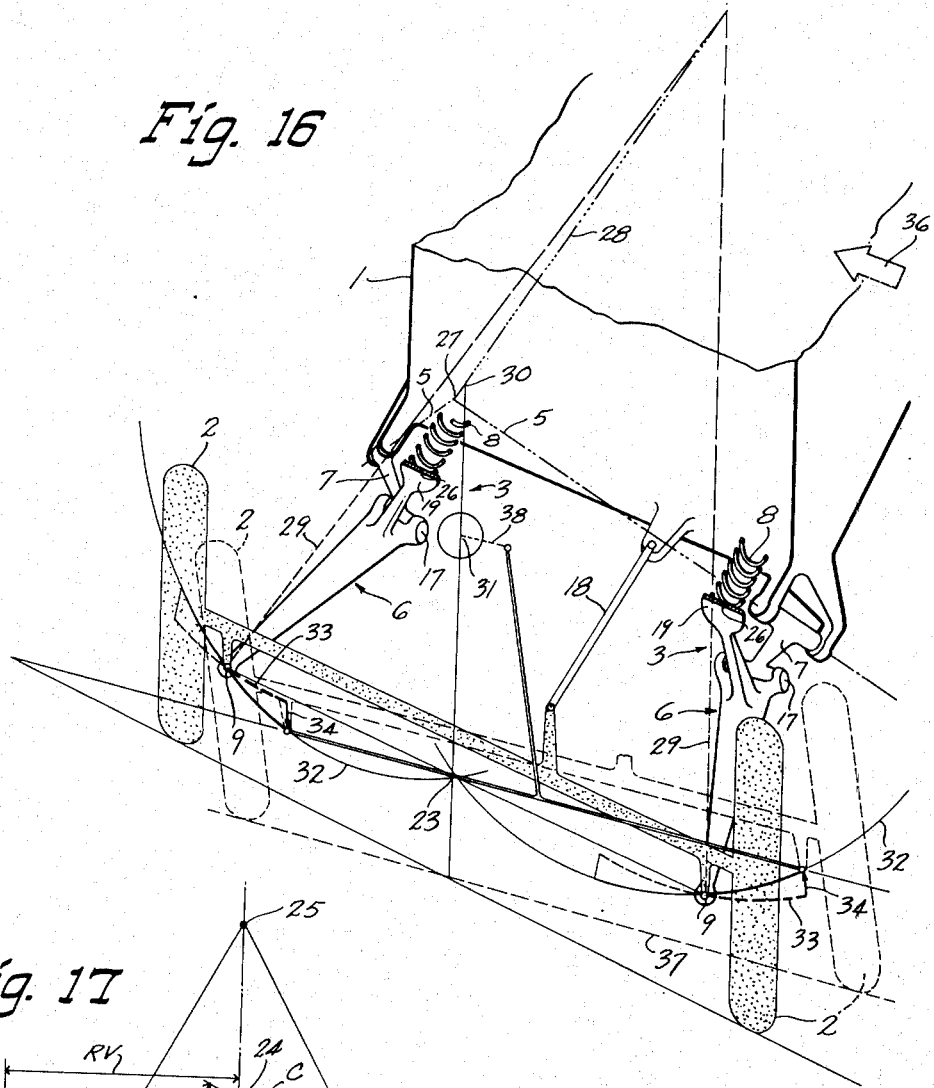
Fig. 16 is a diagrammatic geometric view of a typical skew banking arm construction illustrating the dual action of the springs in aiding the banking action.

In the rear set of banking arms shown in Figs. 1, 2 and 10 to 13, and in both front and rear banking arms shown in Figs. 14 to 16, the springs 8 are compressed from a single direction for both of the actions named. The vertical oscillation of each rear wheel 2 and the corresponding end of axle housing 4 relative to the superstructure 1 acts upon the corresponding spring 8 through the oscillation structure 6, bell crank lever arm 19 and rod 20, and an upward movement of the housing 4 compresses the spring while a downward movement of the housing 4 tends to decompress the spring. The lateral movement of the superstructure 1 relative to rear wheels 2 and axle housing 4 effects a turn of the banking arms at the banking axes 5 and provides a lever action upon the springs 8 through the corresponding bell crank lever arms 19 and rods 20, and a movement of the superstructure toward either side of the vehicle tends to compress the spring 8 on that side without a corresponding lowering of the superstructure thereon and to decompress the opposite spring 8 without a corresponding raising of the superstructure thereon.

In Figures 14 and 15 the front mounting is of a construction similar to the rear mounting, and has springs 8 supported by brackets 22 on the superstructure 1, and operated by upwardly extending bell crank arms 19 on the corresponding lower suspension arms 11, each lever arm 19 being pivotally secured to a rod 20 extending axially through the corresponding spring 8 and operating the same by a plate 21 bearing against the free end of the spring. Fig. 14 shows the mounting with the superstructure upright, and Fig. 15 shows the same in banked position.

The arrangement of the lever arms acting upon the cushion means is schematically illustrated in Fig. 16 where the rod 20 is eliminated and the bell crank lever arm 19 directly engages the end of spring 8 at a point 26.

The geometry of the mounting follows, in general, the principles described in the copending application Serial No. 724,062, referred to above, and shown in Figs. 2 and 16, and partly in other figures.

The skew banking axes 5 for one set of banking arms meet at a point 27 above the level of the center of mass and which determines a motion center line 28 extending from the point 27 to the intersection for the extended banking arm lines 29. The lines 29 extend normal to the corresponding axes 5 from the points 9 of effective road contact for the corresponding banking arms, which in the illustration shown are the corresponding ball and socket joints.

The center of motion 30 for the set of banking arms is located on the motion center line 28 at the point of intersection therewith of a line drawn normal to line 28 from the effective point 31 of the center of mass supported by the set of banking arms, which point 31 in the specific construction illustrated is located directly above the line connecting the road contact points 9 midway between the points and at the general level of the center of mass 24 for the superstructure.

The center of motion 30 for the set of banking arms lies on and determines the height of the longitudinal line which constitutes the secondary center of motion 25 for the whole vehicle. In considering the mounting at one end of the superstructure, the center of motion 30 may be considered to be the same as the secondary center of motion 25 for the vehicle, and during operation of the banking arms the center of motion 30 may move as described in the copending application referred to. In the construction illustrated for the rear end, the center of motion 30 is close to the point 27.

Referring to the several mountings illustrated, if the turn at the banking axes 5 is blocked, the springs 8 will function much as in the present day vehicles to provide for separate vertical oscillation of either wheel and for a turn at the primary center of motion 23 on curves. If the turn of the oscillation structure 6, shown for illustrative purposes to be about the hinge axis 17, is blocked, the springs 8 will function to control the turn at the banking axes 5 and provide for an inward banking effect upon the superstructure on curves with a turn at the secondary center of motion 30.

In designing the mounting the resistance to turn at the banking axes 5 determined by the leverage provided therefor should be less than the resistance to turn at the oscillation axes 17, so that upon a curve the superstructure will tend to operate the springs 8 by means of the turn at the banking axes 5 and to effect operation about the secondary center of motion in preference to operation about the primary center of motion.

The leverage to employ for this purpose is dependent upon the inclination and effective operation of the banking axes 5, the height and travel of the effective center of mass 31 relative to the outer ends 9 of the banking arms, and the spacing of the effective road contact points 9. Additional consideration must be given to the capacity and characteristics of the spring or cushion means and to the space requirements.

Figure 17:
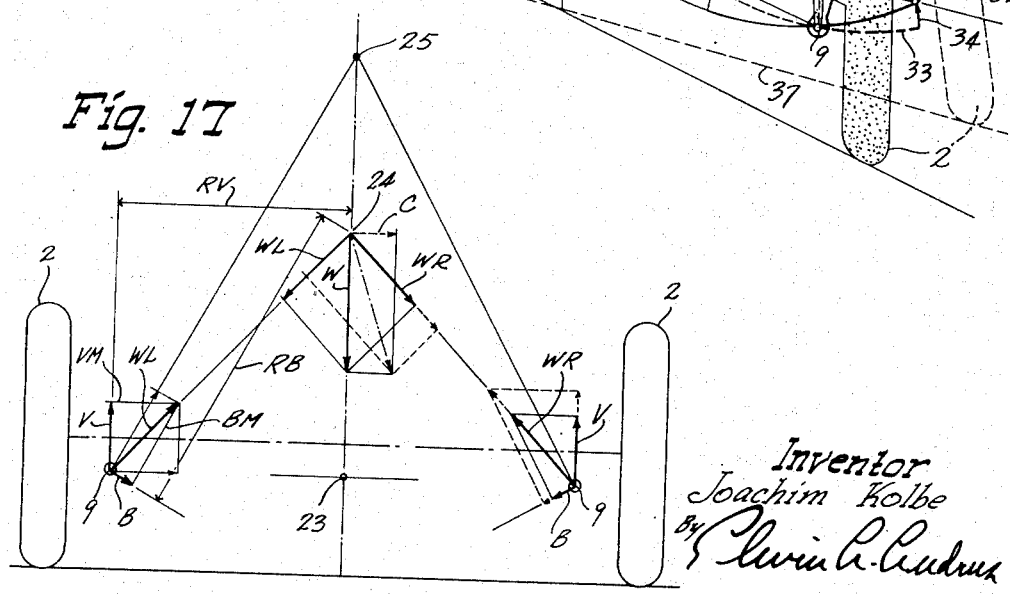
Fig. 17 is a diagram force distribution for establishing the moment factors involved in a banking mounting.

For determining the mechanical advantage required in any given instance, reference is made to the diagram of forces shown in Fig. 17 from which it is possible to obtain the ratio of moment involved as a basis for establishing the final spring operating leverage and the final design location for the springs.

In Fig. 17 the weight of the superstructure is represented by the arrow W extending downward from the center of gravity 24. This weight is distributed equally to both sides as represented by the vector forces WL and WR extending in a direction from the center of gravity 24 toward the corresponding left and right hand effective road contact points 9 for the banking arms.

The vector forces WL and WR are opposed by identical forces of opposite direction to the corresponding vector forces, and which are shown by identically labeled arrows extending upwardly and inwardly from the corresponding effective road contact points 9 toward the center of gravity 24.

Considering only the left side of the diagram, the force WL is divided in relation to the primary center of motion 23 into two component forces, and in relation to the secondary center of motion 25 for the selected banking arm into two component forces, which forces are expressed in a direction toward the respective center of motion and in a direction at right angles thereto in each instance. The latter right angle forces are the only active forces in relation to movement of the point 9 relative to mass center 24.

The active force for vertical movement of point 9 is represented by the arrow V extending vertically from point 9, and the length of which is determined by a line VM drawn normal to V from the upper end of force arrow WL.

The active force for inward banking movement of point 9 is represented by the arrow B extending perpendicular to the line connecting point 9 with the secondary center of motion 25, and the length of which arrow B is determined by a line BM drawn normal to B from the upper end of force arrow WL.

The moment for force V with regard to the center of mass 24 is represented by the product V times RV where RV is the shortest distance between the mass center 24 and the extended line of direction of force V.

Likewise, the moment for force B with regard to the center of mass 24 is represented by the product B times RB where RB is the shortest distance between the mass center 24 and the extended line of direction of force B.

The ratio of the moments $V \cdot RV$ and $B \cdot RB$ expresses the preference of the superstructure represented by mass center 24 to move about either the primary center of motion 23 or the secondary center of motion 25, as the case may be. In the diagram illustrated $V \cdot RV$ is substantially greater than $B \cdot RB$, and the ratio of these moments indicates a substantial preference for the superstructure to move about the primary center 23 rather than about the secondary center 25.

The ratio of moments, referred to above, will not be changed substantially by loading of the superstructure greater on one side than on the other, or by centrifugal forces tending to move the superstructure laterally.

The broken lines in Fig. 17 illustrate the change in force distribution resulting from a centrifugal force corresponding in magnitude and direction to the force arrow C extending laterally from the mass center 24. The forces V and B at point 9 on the side toward which C is directed are increased as shown, while the corresponding forces V and B on the opposite side are decreased (not shown). The ratio between force V and force B remains substantially constant. This means that the moment ratios for any given force condition will correspond to those effective under all force conditions encountered.

This ratio $$\frac{V \cdot RV}{B \cdot RB}$$

illustrated, should be compensated in the structure of the present invention by a mechanical advantage of the reverse order for the corresponding leverage systems acting upon the springs 8 in order at least to remove the preference for vertical oscillation as against banking. In order to make certain the desired banking action for the mounting, this mechanical advantage of the spring operating leverage systems should be increased to give a preference for banking as against vertical oscillation.

For this purpose the ratio or factor of moments multiplied by the ratio or factor of the leverage systems expressed by the mechanical advantage referred to, gives an over all comparative ratio of resistance as between the turn at the primary center of motion and the turn at the secondary center of motion. Where the shock absorbers are employed also to influence the turn at the secondary center of motion, a ratio or factor of resistance more favorable to banking should be employed.

A factor of resistance more favorable to banking will give less degree of banking per unit of lateral movement of the superstructure than a factor of resistance that is less favorable to banking. In this way the most efficient structure can be worked out for a given spring.

In general for any given structure a soft spring, which might improve the ride from a vertical wheel oscillation standpoint, will give less banking than a stiff spring.

Once the above factors of the mounting are established, the amount of banking obtainable is limited only by the space requirements for the vehicle parts in their movement relative to each other. If desired, any lever arm for the construction can be made adjustable in length to provide for varying conditions, as where the load of the vehicle is likely to vary substantially.

Where the moment ratio for actuation of the springs 8 is insufficient to provide the desired resistance to the turn at the secondary center of motion, for instance, where space requirements limit actuation of the springs, it is possible to employ additional banking springs, as shown in application Serial No. 724,062, above referred to.

The essence of the invention lies in changing a substantial part of the spring operating space of the vertical oscillation springs without a corresponding vertical component of movement of the wheels relative to the superstructure, so that upon lateral shifting of the superstructure on a turn the spring operating space on the outside is shortened automatically without a corresponding lowering of the superstructure and the spring operating space on the inside is lengthened without a corresponding raising of the superstructure. In this way it is possible to eliminate substantially all tilting of the superstructure toward the outside and to avoid all loss in the banking effect for a given mounting.

Any combination of effects may be obtained depending upon the type of suspension, the space requirements and the forces and leverages involved.

Where the total permissible lateral movement of the center of mass of the superstructure for the given spring and space requirements is considered to be about four inches and the banking mounting is designed to produce a maximum of 10° of inward banking of the superstructure by turn at the secondary center of motion as the result of two and one-half inches of lateral movement, then upon a faster turn the additional one and one-half inches of movement would result in additional compression of the spring by a turn at the primary center of motion and a corresponding loss in banking effect. It may, however, be desirable to provide for early completion of the banking action with a slight loss of effect upon extremely fast turns, since for normal operation and slow turns the banking effect is thereby improved. If desired the loss in banking effect in extreme cases may be prevented by other means such as by additional work for the springs provided, for instance, by a predetermined lowering of the center of mass of the superstructure.

Referring to Fig. 16, a suitable overall ratio of resistance may be expressed in the comparison of the amount of lateral movement of the effective center of gravity 31 for the superstructure to reach a given compression of the springs under two separate conditions, (1) where turn at the oscillations axes 17 is prevented by blocking, and (2) where turn at the banking axes 5 is prevented by blocking. For instance, if a two inch lateral travel of the effective center of gravity 31 with the banking axes blocked will produce a given spring compression by turn at the primary center of motion 23, and if it takes a two and one-half inch lateral travel of the center of gravity with the oscillation axes blocked to produce the same amount of spring compression by turn at the secondary center of motion 25, then the overall ratio of resistance is five to four in favor of turning at the banking axes. This ratio, when once embodied in a mounting, remains substantially throughout the operating range of movements involved and will always effect the operation of the secondary center of motion in preference to that of the primary center of motion up to the maximum inward banking position obtainable by the mounting, except for a small acceptable change caused by the lateral shifting of the center of gravity.

The operation of the invention also may be viewed in terms of the distance between the effective point of road contact and the superstructure. In banking mountings heretofore proposed, the effective length of the wheel carriers has generally changed on turns as a result of spring operation under the influence of centrifugal action upon the superstructure. The mounting of the present invention maintains the effective length of the wheel carriers more nearly constant under road turn influences.

In general the effective length of each banking arm employing an independent suspension wheel carrier is determined by the length of the banking arm lines 29 between the banking axis and the center of the road contact with the tire of the corresponding wheel. Likewise, the effective length of each banking arm employing an axle mounted wheel carrier is determined by the straight line 29 drawn normal to the banking axis 5 from the center of the corresponding effective road contact point 9, and is represented by the length of the line between said axis and said contact point.

Fig. 16 schematically illustrates the improvement obtained by the dual spring action of the invention in the rear end construction of Figs. 1, 2, and 10 to 15. For the purpose of simplifying the geometric illustration the superstructure is considered as though it is held in fixed position and each wheel is considered as though it moves with its wheel carrier about the banking axis 5 therefor. The outer end of each banking arm line 29 at the center of point 9 is shown as moving along a curve 32 having the opposite end of line 29 at the banking axis 5 as its center.

Without the dual spring action of the present invention, the spring would yield during banking to change the length of line 29 and provide an effective movement for the center of point 9 as shown in dotted line 33 on opposite sides of the central straight ahead position. For the present invention, with dual spring action the length of line 29 remains more nearly constant and the movement for its outer end more nearly follows the curve 32, as shown. The arrow 34 at the final banked position represents the saving in banking effect by the invention.

Where the banking geometry for a given mounting is designed to provide greater banking effect for a given turn at the banking axes than is desired or needed it is possible to allow the springs to additionally compress and reduce the resulting banking effect as in the front mounting, shown in Fig. 5. In such instances the final path of movement for point 9 will not coincide with the curve 32 which represents the geometric path therefor, but will be along a curve 35 disposed somewhere between curve 32 and curve 33.

In this instance the springs are allowed to interfere to some extent with the banking effect and it is possible to provide a steep banking geometry which would normally have a given secondary center of motion, and to flatten the curve of actual movement of points 9 by operation of the springs to provide a slightly higher active secondary center of motion, thereby accommodating a greater range of space requirements and making it possible to employ a more compact wheel carrier construction.

The shaded position for the wheels 2 in Fig. 16 represents the straight ahead position for carriers 3 with the superstructure 1 parallel to the road. The arrow 36 indicates the direction of the lateral movement of the superstructure 1 relative to the wheels on a turn, which is illustrated by a movement of the wheels 2 in the opposite direction, to the light broken line positions shown. Coincident with this movement and by reason of the inclination of the banking axes 5 the outside wheel 2 will lower relative to the superstructure and the inside wheel 2 will rise relative to the superstructure to provide a new effective road line 37 therebetween which results in the inward banking of the superstructure relative to the road.

The effective center of mass 31 of that part of the superstructure supported by the wheels shown moves laterally with the superstructure, and this movement is represented by the line 38 extending from the effective center 31 in the direction of movement of the wheels 2.

By employing dual action of the springs it is possible to dispose the axes 5 vertically or to employ any suitable universal joint connection between the wheel carrier and superstructure, and to obtain the benefit of preventing at least partly the tilting of the superstructure to the outside on a turn and thereby produce a counter-banking action.

Fig. 18 illustrates the benefit obtained by the dual spring action of the invention as applied to a mounting in which each vertical oscillation structure 6 for carriers 3 is secured to the superstructure by a universal joint having typical pivotal hinges disposed at right angles to each other. The spring 8 is positioned to be actuated by a turn about either hinge.

The universal joint may be of any suitable construction which provides for pivotal oscillation of the wheel carrier in any direction relative to the superstructure without turning of the carrier on its longitudinal axis. In the drawing the hinges of the universal joint are shown as vertical and horizontal respectively. The hinges may be disposed at an angle if desired, keeping them at 90° to each other in which case both hinges of the universal joint will be operated by the vertical oscillation of the wheel carrier and also by the lateral movement of the superstructure.

Considering the co-action of the connected pair of wheel carriers the spring 8 for each carrier cooperates with the universal joint in controlling the action of the wheel carrier to establish an effective substantially horizontal axis for the carrier for vertical wheel oscillation and to establish an effective skew banking axis for the carrier for effecting the desired banking action of the superstructure. In practice, the pivotal axes for the wheel carrier should remain relatively fixed with the superstructure, although some movement of the axes is permissible and possible.

The hinges of the universal joint may be disposed at an angle to each other different from the 90° angle referred to, for the purpose of providing a banking universal joint which favors pivotal action of the wheel carrier in certain directions. In this sense the oscillation and banking hinges of the construction of Figs. 1 to 16, constitute a banking universal joint with the hinges disposed at the desired favorable pivotal axes for the corresponding wheel carriers.

In Fig. 18 the circle 32 for each point 9 lies in a plane parallel to the road and represents the movement of point 9 during the turn at the vertical hinge. To the extent that the leverage system actuates each spring 8 during a turn at the corresponding vertical hinge, the point 9 is maintained substantially in the plane of circle 32 and prevented from changing its travel as indicated by the dotted line 33 by reason of a turn at the horizontal hinge. The improvement obtainable is indicated by the arrows 34.

The lateral movement 36 of the effective center of mass 31 to obtain a given improvement represented by arrows 34 with the mounting of Fig. 18 is substantially greater than that necessary to obtain a corresponding improvement with the mounting of Fig. 16.

Lateral movement of the superstructure on a turn effecting a turn about the vertical hinge actuates the springs 8 to compress the outer spring and decompress the inner spring to thereby adjust the spring space ahead of the normal operation of the springs which would be effected otherwise by the lateral shifting of the superstructure mass. In this way tilting of the superstructure toward the outside can be avoided.

It is possible that with cushion means of the proper characteristics and with suitable moment factors and leverage, the construction of Fig. 18 might effect a small amount of inward banking of the superstructure on turns.

Likewise it is possible in the construction of Fig. 16 to utilize a flatter banking geometry and employ the springs to obtain a part of the desired banking effect by providing the necessary leverage and lateral movement for the superstructure.

The invention makes it possible to greatly extend the practical designs of mountings for obtaining inward banking on turns, and thereby broadens the scope of the counterbanking arms of copending application Serial No. 724,062, referred to above, so that the banking axes may be disposed at less favorable angles, and even in the vertical position illustrated in Fig. 18, without entirely destroying the banking effect obtainable.

Figure 19:
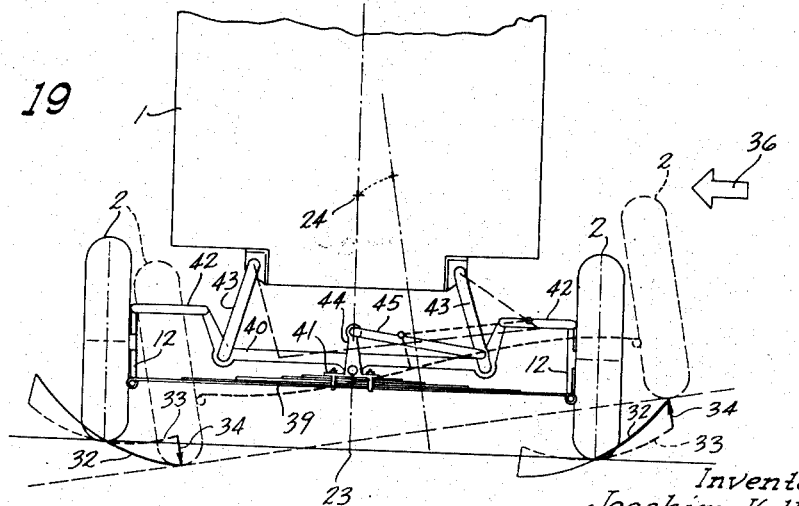
Fig. 19 is a diagrammatic front elevation of a vehicle showing the application of the invention to a link mounting construction.

Fig. 19 illustrates the invention as applied to a link mounting for the front end of the superstructure to effect inward banking of the superstructure upon turns, it being understood that the mounting is stabilized by employing a stable rear mounting and connecting the same thereto somewhat as shown in applicant's earlier Patent No. 2,262,289, granted November 11, 1941.

In the construction illustrated a transverse leaf spring 39 has its outer ends pivoted to the lower ends of the corresponding kingpin supports 12. A transverse support member 40 is pivoted to the spring seat 41 and has upwardly extending ends to which the upper arms 42 are pivoted. The outer ends of the upper arms 42 are pivoted to the upper ends of the corresponding kingpin supports 12.

A pair of opposed links 43 support the superstructure 1 upon member 40 in a manner generally effecting inward banking of the superstructure in response to outward lateral movement of the superstructure with the front mounting connected to a corresponding rear mounting to provide stability and unison of action, as set forth in U. S. Patent No. 2,234,676, granted to the present inventor and referred to above.

The spring 39 serves to control vertical oscillation of the wheels.

According to the present invention, the spring 39 is also actuated by lateral movement of the superstructure by means of a vertical lever arm 44 extending upwardly from the center of the spring seat 41 and secured thereto. A horizontal link 45 joins the upper end of lever 44 to one of the links 43 at a predetermined point intermediate its ends so that movement of the link 43 moves the lever 44 correspondingly to one side and effects tilting of the spring seat 41 in a direction tending to change the load distribution on the spring on both sides the same as in banking arm structures previously described above.

The relative positions for wheels 2, leaf spring 39, links 43, lever 44 and link 45 after banking of the superstructure in response to its lateral movement in the direction of arrow 36, are illustrated diagrammatically in broken lines.

The gain in banking effect is illustrated by the difference between curves 32 and 33 for the road contact center points 9 of the wheels, and is represented by the arrows 34.

In carrying out the invention, a more stable vehicle is provided than heretofore possible in inward banking structures. This stability is obtained by reducing the lateral movement of the superstructure required to obtain a given banking action, and also by providing greater resistance to one-sided loading of the superstructure.

In general, the higher the secondary center of motion is for the superstructure, the flatter is the banking effect obtainable from the geometry of the construction, and one sided loading of the superstructure then has less influence upon the position of the superstructure.

In former inward banking mountings the secondary center of motion had to be kept reasonably low to provide a sufficiently steep banking effect to obtain the desired banking.

In the present construction it is possible to employ a relatively high secondary center of motion with a corresponding flatter banking action and to employ the springs to provide the balance of the banking action desired. This is particularly so where the springs have substantial capacity and can be utilized to increase the banking action.

Furthermore, by saving the loss in banking heretofore encountered in actuation of the springs the desired banking action can be obtained readily with a flatter geometry.

The distinction between operation at the primary center of motion and at the secondary center of motion is mainly for design purposes. Actually, unless one or the other is entirely eliminated in function, there is a turn about both centers simultaneously and a single resultant center of motion is thereby established for the superstructure.

At any instant in the operation of the construction the location of this resultant center of motion can be determined after establishing the location for the primary and secondary centers of motion. The location of the resultant center of motion will move during a given banking operation depending to a large extent upon the relative movement of the primary and secondary centers of motion and the center of mass.

Various embodiments of the invention may be employed within the scope of the claims.

I claim:

1. In a vehicle in which an inward banking support is provided for the superstructure upon the wheels and resilient cushion means are employed with said banking support for vertical oscillation of the wheels relative to the superstructure independently of banking action of the superstructure, leverage mechanism disposed at one end of said cushion means to actuate the same in response to vertical oscillation of the wheels relative to the superstructure, and leverage means disposed at the opposite end of said cushion means to actuate the same in response to relative lateral movement between the wheels and the superstructure independently of vertical wheel oscillation upon turns to prevent loss of banking effect resulting from changes in load distribution upon said cushion means.

2. In a vehicle in which an inward banking support is provided for the superstructure upon the wheels and resilient cushion means are employed with said banking support for vertical oscillation of the wheels relative to the superstructure, leverage mechanism disposed at one end of said cushion means to actuate the same in response to vertical oscillation of the wheels relative to the superstructure, and leverage means disposed at the opposite end of said cushion means to actuate the same in response to relative lateral movement between the wheels and superstructure upon turns to prevent loss of banking effect resulting from changes in load distribution upon said cushion means, said last named leverage means having a greater mechanical advantage than that operable upon the cushion means by vertical oscillation of the wheels while negotiating turns.

3. In a vehicle embodying a superstructure supported by a plurality of pairs of banking arms with separate wheels and corresponding wheel carriers, the banking arms of each pair being interconnected and disposed on opposite sides of the superstructure, separate resilient cushion means disposed between and connected to the superstructure and the corresponding wheel carriers therefor providing for vertical support of the superstructure and which cushion means tends to yield under the influence of centrifugal forces upon the superstructure on turns to tilt the superstructure outwardly about a primary center of motion substantially below the center of mass of the superstructure, said banking arms being disposed to effect rotational movement of the superstructure about a secondary center of motion substantially above the center of mass of the superstructure and in a direction opposite to that about the primary center of motion in response to lateral movement of the center of mass of the superstructure under the influence of said centrifugal forces, and a lever disposed to actuate said cushion means in response to lateral movement of the center of mass of the superstructure and in advance of said yielding influence to thereby substantially prevent loss in banking by reason of the yielding of said cushion means.

4. In a vehicle in which the superstructure is supported on wheels disposed on opposite sides of the superstructure for vertical oscillation relative to the superstructure tending to turn the superstructure about a primary center of motion below its center of mass and the superstructure is disposed and supported to turn about a secondary center of motion above its center of mass to an inward banking position in response to centrifugal forces moving the center of mass laterally on a turn, means maintaining the wheels against lateral separation, a common cushion means disposed to be actuated by both the vertical oscillation of the wheels toward the superstructure and said lateral movement of the superstructure, and means disposed to counteract vertical yielding of the superstructure upon actuation of said cushion means by said lateral movement of the superstructure.

5. In a vehicle in which the superstructure is supported on wheels disposed on opposite sides of the superstructure for vertical oscillation relative to the superstructure tending to turn the superstructure about a primary center of motion below its center of mass and the superstructure is disposed and supported to turn about a secondary center of motion above its center of mass to an inward banking position in response to centrifugal forces moving the center of mass laterally on a turn, a common cushion means disposed to be actuated by both the vertical oscillation of the wheels and said lateral movement of the superstructure, and leverage systems separately actuating said common cushion means in response to vertical oscillation of the wheels and to lateral movement of the superstructure, respectively, said lateral movement leverage system actuating said cushion means in a direction to substantially compensate for yielding of the cushion means under the influence of said vertical oscillation leverage system on a turn during banking.

6. In a vehicle in which the superstructure is supported on wheels disposed on opposite sides of the superstructure for vertical oscillation relative to the superstructure tending to turn the superstructure about a primary center of motion below its center of mass and the superstructure is disposed and supported to turn about a secondary center of motion above its center of mass to an inward banking position in response to centrifugal forces moving the center of mass laterally on a turn, a common cushion means disposed to resist both the vertical oscillation of the wheels and said lateral movement of the superstructure, and leverage systems separately actuating said common cushion means in response to vertical oscillation of the wheels and to lateral movement of the superstructure, respectively, the mechanical advantage for actuation of the cushion means in response to lateral movement of the superstructure is compared to that in response to vertical oscillation of the wheels bearing a ratio at least as great as the moment ratio for the mounting obtained by the distribution of forces tending to turn the superstructure about its primary center of motion as compared to those tending to turn the same about its secondary center of motion.

7. In a vehicle in which the wheel supported superstructure is mounted on a plurality of longitudinally spaced sets of interconnected banking arms employing cushion means connected thereto and to the superstructure for the vertical oscillation of the wheels relative to the superstructure, a leverage system operated by the turn of each banking arm relative to the superstructure in response to centrifugal forces acting upon said superstructure and disposed to actuate the cushion means in a direction favorable to inward banking of the superstructure on a turn.

8. A vehicle comprising a superstructure and front and rear wheels, wheel carriers connected in front and rear pairs to operate in unison, each wheel carrier for at least one of said pairs comprising a hinge support member hinged to the superstructure on an inclined axis disposed to cause the superstructure to rotate about a longitudinal axis located above the center of gravity in response to lateral forces, a wheel suspension arm hinged to the support member on an axis non-parallel to said first mentioned axis and having a spring operating member fixed thereto and displaced from both of said axes, and a spring interposed between said spring operating member and a stationary element on the superstructure to be stressed by movement of the arm about either axis.

9. A vehicle comprising a superstructure and front and rear wheels, wheel carriers connected in front and rear pairs to operate in unison, each wheel carrier for at least one of said pairs comprising a hinge support member hinged to the superstructure on an axis inclined both laterally and longitudinally of the vehicle and disposed in correlation to the corresponding axis of the opposite carrier to provide a motion center line for the pair extending above the effective center of mass for that portion of the superstructure supported thereby, a wheel suspension arm hinged to the support member on an axis non-parallel to the first mentioned axis and having a movable spring operating member rigidly connected thereto and displaced from both of said axes, and a compression spring interposed between said spring operating member and a stationary element on the superstructure to be compressed by upward movement of the arm about the last mentioned axis and by movement of the arm about the first mentioned axis toward the median plane of the vehicle, whereby the superstructure is supported on the wheels and is banked inwardly in response to lateral forces thereon as in the case of centrifugal forces in manipulating curves.

10. A vehicle comprising a superstructure and front and rear wheels, wheel carriers connected in front and rear pairs to operate in unison, each wheel carrier for at least one of said pairs comprising a hinge support member hinged to the superstructure on an axis inclined both laterally and longitudinally of the vehicle and disposed in correlation to the corresponding axis of the opposite carrier to provide a motion center line for the pair extending above the effective center of mass for that portion of the superstructure supported thereby, a wheel suspension arm hinged to the support member on an axis non-parallel to the first mentioned axis and having a movable spring operating member rigidly connected thereto and displaced from both of said axes, and a compression spring interposed between said spring operating member and a stationary element on the superstructure to be compressed by upward movement of the arm about the last mentioned axis and by movement of the arm about the first mentioned axis toward the median plane of the vehicle, whereby the superstructure is supported on the wheels and is banked inwardly in response to lateral forces thereon as in the case of centrifugal forces in manipulating curves, each of the front wheel carriers comprising in addition a second suspension arm hingedly related to said hinge support member, both of the suspension arms of each front wheel carrier being pivotally connected to the kingpin support for the associated wheel, said arms, hinge support member and kingpin support forming a quadrilateral designed to be deformed from normal position by vertical wheel oscillations.

11. A superstructure banking vehicle comprising a superstructure and paired front and rear wheels and front and rear wheel carriers, each of the wheel carriers being connected to the other carrier of the pair and comprising a hinge support member hinged to the superstructure on an axis inclined both laterally and longitudinally of the vehicle, a wheel suspension arm hinged to said support member on a substantially horizontal axis non-parallel to the first mentioned axis, said arm being provided with a spring actuating member displaced from both of said axes, a spring having a portion fixed relative to the superstructure and another portion connected to said spring actuating member to be operated by movement of said arm about either axis, and a wheel supporting member carried by said suspension arm, whereby the superstructure is supported on the wheels and is banked in response to lateral forces acting thereon and in a direction opposite to said forces.

12. A superstructure banking vehicle comprising a superstructure and paired front and rear wheels and front and rear wheel carriers, each of the front wheel carriers being connected to the other carrier of the pair and comprising a steering knuckle support, a member hinged to the superstructure on an axis inclined upwardly toward the axis of the wheel with which it is associated and toward the median plane of the vehicle, a wheel suspension arm pivotally connected to said support and hinged to said member on a substantially horizontal axis, said arm being provided with a spring actuating member displaced from both of said axes, a spring having a portion carried by the superstructure and another portion connected to said spring actuating member to be operated by movement of said arm about either axis, and a second suspension arm connected to said support and to said member to maintain the upright position of the wheel, whereby the superstructure is supported on the wheels and is banked in response to lateral forces acting thereon and in a direction opposite to said forces.

13. In a vehicle comprising a superstructure, a plurality of wheels supporting the superstructure for travel, a plurality of wheel carriers connecting the superstructure and wheels and having resilient cushion means connected to the superstructure and to said wheel carriers to provide for vertical oscillation of the wheels relative to the superstructure, said wheel carriers being constructed to provide a primary center of motion below the center of mass of the superstructure about which the superstructure turns under the influence of centrifugal forces which effect an unequal distribution of vertical forces on the wheels tending to tilt the superstructure to the outside of a curve in accordance with a yielding of the cushion means, and a secondary center of motion substantially above the center of mass of the superstructure about which the superstructure turns under the influence of centrifugal forces in a direction tending to bank the superstructure inwardly on a curve, the improvement comprising a leverage system disposed to actuate said resilient cushion means in correlation to lateral movement of the superstructure in response to centrifugal forces acting thereon and in a direction favorable to inward banking to thereby reduce the turn at the primary center of motion and the corresponding outward tilting effect upon the superstructure.

14. In a vehicle comprising a superstructure, a plurality of wheels supporting the superstructure for travel, a plurality of wheel carriers connecting the superstructure and wheels and having resilient cushion means connected to the superstructure and to said wheel carriers to provide for vertical oscillation of the wheels relative to the superstructure, said wheel carriers being constructed to provide a primary center of motion below the center of mass of the superstructure about which the superstructure turns under the influence of centrifugal forces which effect an unequal distribution of vertical forces on the wheels tending to tilt the superstructure to the outside of a curve in accordance with a yielding of the cushion means, and a secondary center of motion substantially above the center of mass of the superstructure about which the superstructure turns under the influence of centrifugal forces in a direction tending to bank the superstructure inwardly on a curve, the improvement comprising reducing the lateral movement of the superstructure for a given centrifugal force by employing the resilient cushion means to block at least a substantial part of the lateral movement required for turn at the primary center of motion, and actuating said cushion means by the lateral movement required for turn at the secondary center of motion.

15. In a vehicle comprising a superstructure supported by a plurality of banking arms arranged in pairs with the banking arms of each pair on opposite sides of the superstructure and interconnected transversely of the superstructure, said banking arms being constructed to provide for a combined lateral and vertical curvilinear travel of the effective road contact point of each banking arm relative to the superstructure in a direction tending to effect an inward banking of the superstructure in response to lateral movement of the superstructure under the influence of centrifugal forces on turns, and resilient cushion means for said banking arms disposed to provide for vertical oscillation of the corresponding road contact points relative to the superstructure and which tend to reduce the vertical component of relative travel for said road contact points resulting from the lateral movement of the superstructure, the improvement comprising connecting one end of the cushion means to the superstructure and the other end of the cushion means to the banking arms and providing a leverage system disposed to pre-absorb said cushion means during lateral movement of the superstructure to thereby substantially maintain the curvilinear path of movement for each of said road contact points.

16. In a vehicle comprising a superstructure supported by a plurality of banking arms constructed to provide for a combined lateral and vertical curvilinear travel of the effective road contact point of each banking arm relative to the superstructure in a direction tending to effect an inward banking of the superstructure in reponse to lateral movement of the superstructure under the influence of centrifugal forces on turns, and resilient cushion means for said banking arms disposed to provide for vertical oscillation of the corresponding road contact points relative to the superstructure and which tend to reduce the vertical component of relative travel for said road contact points resulting from the lateral movement of the superstructure, the improvement comprising means connecting one end of said cushion means to the superstucture, and a leverage system disposed to actuate said cushion means upon lateral movement of the superstructure and provide a greater vertical component of movement for the corresponding road contact points for a given lateral movement thereof relative to the superstructure to thereby maintain the relative movement for said road contact points more nearly coinciding with said curvilinear paths.

17. A vehicle comprising a superstructure, a plurality of wheel carriers supporting said superstructure and arranged in sets each embodying at least one pair of opposed interconnected wheel carriers disposed on opposite sides of the superstructure, a universal joint connecting each wheel carrier to the superstructure and providing for free vertical oscillation of the opposite end of the corresponding wheel carrier relative to the superstructure and for free lateral movement of the superstructure, and a resilient cushion means connected between each wheel carrier and the superstructure offset from the corresponding universal joint and disposed to be actuated by a turn at the universal joint in any direction within the purview of the vertical wheel oscillation and lateral superstructure movement specified, each said wheel carrier being controlled in its movement by a cooperation between the corresponding universal joint and cushion means to move about a substantially horizontal axis during vertical oscillation of the outer end of the wheel carrier relative to the superstructure and to move about a skew banking axis relative to the superstructure during lateral movement of the latter.

18. A vehicle comprising a superstructure adapted to counter-bank on turns, a plurality of sets of banking arms disposed to support said superstructure and spaced longitudinally of the same, each set of banking arms being connected to the superstructure and constituting at least a pair of opposed banking arms spaced laterally apart on opposite sides of the longitudinal center line of the superstructure and extending from the superstructure to the effective road support therefor with the ends of the arms embodying in effect a universally movable joint at one corresponding end of each arm and a skew pivotal banking axis at the other end of each arm, means interconnecting the banking arms of each pair to retain said effective universally movable joints in substantially constant spaced relation, resilient means associated with each banking arm and disposed to provide for relative vertical oscillation between the superstructure and the point of effective road support for the corresponding arm, one end of each said resilient means being carried by the superstructure and the other end thereof being carried by the corresponding banking arm, the plane of each banking arm of a pair of arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, and leverage mechanism disposed to be operated by the turn of each banking arm at its axis to actuate the corresponding resilient means and thereby substantially prevent a vertical yielding between the superstructure and the point of effective road support for the corresponding arm under the influence of centrifugal forces on turns.

19. A vehicle comprising a superstructure adapted to counter-bank on turns, a plurality of sets of banking arms disposed to support said superstructure and spaced longitudinally of the same, each set of banking arms constituting at least a pair of opposed banking arms spaced laterally apart on opposite sides of the longitudinal center line of the superstructure and extending from the superstructure to the effective road support therefor, a connection between each banking arm and the superstructure embodying in effect a skew banking axis fixed relative to the superstructure, means connecting the banking arms to retain the outer ends of the same in substantially constant spaced relation, resilient means disposed to provide for vertical oscillation of the outer end of each banking arm substantially independently of pivotal movement at the banking axis, one end of each said resilient means being carried by the superstructure and the other end thereof being carried by the corresponding banking arm, the plane of each banking arm of a pair of arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, and leverage mechanism disposed to be operated by the turn of each banking arm at its axis to actuate the corresponding resilient means and thereby substantially prevent a vertical yielding between the superstructure and the point of effective road support for the corresponding arm under the influence of centrifugal forces on turns.

20. A vehicle comprising a superstructure adapted to counter-bank on turns, at least one rigid axle structure disposed transversely of the superstructure to support a corresponding part thereof, a set of axle carriers for each said axle structure extending between the same and the superstructure and constituting at least a pair of opposed banking arms spaced laterally apart on opposite sides of the longitudinal center line of the superstructure, connections for each said pair of banking arms to the superstructure and axle structure embodying in effect a universally movable joint at one corresponding end of each arm and a skew pivotal banking axis at the other end of each arm, resilient means associated with each carrier and disposed to provide for relative vertical oscillation between the superstructure and the axle structure, one end of each said resilient means being carried by the superstructure and the other end thereof being carried by the corresponding banking arm, the plane of each banking arm of a pair of opposed arms containing the corresponding banking axis and the center of the effective universally movable joint therefore meeting the plane of the other arm in a motion center line for the pair passing substantially above the level of the effective center of mass for the portion of the superstructure supported by the pair of arms at the point where said motion center line crosses over the effective transverse road line at the outer end of the arms, leverage mechanism disposed to be operated by the turn of each banking arm at its axis to actuate the corresponding resilient means and thereby substantially prevent a vertical yielding between the superstructure and the point of effective road support for the corresponding arm under the influence of centrifugal forces on turns, additional means connecting the rigid axle structure to the superstructure and disposed to determine the rotational position of the axle structure at all times in cooperation with said banking arms, and a banking support for the remainder of said superstructure correlated to the movement of the superstructure upon said banking arms to guide the superstructure in its rotational banking movement relative to said motion center line.

21. A vehicle comprising a superstructure, at least one pair of transversely spaced wheel carriers constituting independent wheel suspensions for supporting a corresponding part of the superstructure upon the road, each said pair of wheel carriers constituting part of a pair of opposed banking arms extending between the superstructure and the road on opposite sides of the longitudinal center line of the superstructure, connections for each said pair of banking arms to the superstructure embodying in effect a pivotal banking axis for each arm, means interconnecting the banking arms of each pair and disposed to retain the road contact points for the wheels in substantially constant spaced relation at the corresponding center points of road contact therefor, resilient means associated with each carrier and disposed to provide for relative vertical oscillation between the superstructure and the point of effective road support for the corresponding arm, one end of each said resilient means being carried by the superstructure and the other end thereof being carried by the corresponding banking arm, the plane of each banking arm of a pair of arms containing the corresponding banking axis and the center of the road contact between the corresponding wheel and the road meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms, leverage mechanism disposed to be operated by the turn of each banking arm at its axis to actuate the corresponding resilient means and thereby substantially prevent a vertical yielding between the superstructure and the point of effective road support for the corresponding arm under the influence of centrifugal forces on turns, and a banking support for the remainder of said superstructure correlated to the movement of the superstructure upon said banking arms to guide the superstructure in its rotational banking movement relative to said motion center line.

22. A vehicle comprising a superstructure adapted to counter-bank on turns, a plurality of sets of banking arms disposed to support said superstructure and spaced longitudinally of the same, each set of banking arms constituting at least a pair of opposed banking arms spaced laterally apart on opposite sides of the longitudinal center line of the superstructure and extending from the superstructure to the effective road support therefor embodying in effect a universally movable joint at one corresponding end of each arm and a skew pivotal banking axis at the other end of each arm, each of said banking arms being articulated to provide for vertical oscillation of one end relative to the other upon an effective oscillation pivotal axis which is substantially horizontal, resilient means disposed to bridge said oscillation axis and thereby control the articulation of each corresponding banking arm, said resilient means additionally bridging said banking axis to control turn of the corresponding banking arm relative to the superstructure, leverage mechanism disposed to be operated by the turn of each banking arm at its banking axis to actuate the corresponding resilient means and thereby substantially prevent a vertical yielding between the superstructure and the point of effective road support for the corresponding arm under the influence of centrifugal forces on turns, and means interconnecting the opposed banking arms of each pair and disposed to retain the corresponding effective points of road support therefor in substantially constant spaced relation, the plane of each banking arm of a pair of arms containing the corresponding banking axis and the center of the effective universally movable joint therefor meeting the plane of the other arm of the pair in a motion center line for the pair passing substantially above the level of the effective center of mass for the portion of the superstructure supported by the pair of arms at the point where said motion center line crosses over the effective transverse road line at the outer end of the arms.

23. In a motor vehicle, a superstructure, front and rear wheel supported members constituting generally longitudinally extending paired upper and lower wheel guiding means, pivoted connecting means in intersecting planes between the wheel guiding means and the superstructure whereby the superstructure may assume an angularly inclined inward banking position when subjected to lateral forces, and a single resilient means associated with each said wheel guiding means to absorb vertical oscillation shock to which the wheels are subjected, said resilient means bridging said pivotal connecting means to resist turning thereat in a direction effecting actuation of said means in response to lateral movement of the superstructure on turns to thereby prevent loss in inward banking by yielding of said means under changing vertical load conditions effected by said lateral movement.

24. A vehicle comprising a superstructure, a plurality of wheels constituting at least one set of at least one pair of wheels with the wheels of each pair disposed on opposite sides of the superstructure, a set of wheel carriers for each set of wheels disposed between the same and the superstructure to support the latter with its center of mass substantially above the effective road contact points for the carriers and with the sets interconnected to act in unison, a pair of angularly disposed links of substantially equal length constituting a part of each set of the wheel carriers and disposed with parallel substantially horizontal pivotal axes extending longitudinally of the superstructure to provide for vertical oscillation of the corresponding wheel relative to the superstructure, a hinge carrying member to which the inner ends of the corresponding pair of links are pivotally connected, said hinge carrying member being pivotally connected to the superstructure upon an axis inclined to the horizontal and to the vertical longitudinal central plane of the superstructure to provide an inward banking movement of the superstructure by turn at said inclined axes in response to centrifugal forces on a turn or the like, resilient cushion means for each set of wheel carriers connected to one of said links and to said superstructure to resist pivotal movement of said links to provide for limited vertical oscillation of each wheel relative to the superstructure, and a lever mechanism interposed between the superstructure and an operating end of each said cushion means to actuate the latter upon lateral movement of the superstructure ahead of the actuation thereof by the resulting redistribution of the forces tending to cause wheel oscillation relative to the superstructure.

25. In a vehicle having a superstructure and wheels disposed on opposite sides thereof for supporting the same, resilient cushion means for each wheel disposed to provide for vertical wheel oscillation relative to the superstructure, means to maintain the transverse wheel space substantially constant, and a leverage system disposed to operate said cushion means by both vertical forces and lateral forces between the wheels and the superstructure, said leverage system including means to counteract vertical yielding of the superstructure upon actuation of said cushion means by said lateral forces.

26. In an inward banking vehicle having a superstructure and wheels disposed on opposite sides thereof for supporting the same, resilient cushion means disposed between each wheel and the superstructure to provide for vertical oscillation of the wheels relative to the superstructure, means to maintain the transverse wheel space substantially constant, and leverage means connecting the superstructure and wheels disposed to actuate said cushion means during inward banking, said leverage means counteracting the collapse of said cushion means upon inward banking of the superstructure to prevent yielding of the latter thereon.

27. A vehicle in which the superstructure is supported by cooperating pairs of banking arms for inward banking action on turns, the banking arms of each pair being interconnected and each banking arm of at least one pair of arms comprising a hinge support pivotally connected to the superstructure on a skew banking axis of the overslung type, an oscillating arm pivotally connected to said hinge support on a substantially horizontal axis and extending outwardly to the effective road contact point, a coil spring having one end fixed to the superstructure, a movable spring actuating plate engaging the free end of the spring, an actuating rod secured to said plate and extending longitudinally through said spring, and a bell crank arm on said oscillating arm having its outer end connected to said rod to move the same longitudinally for actuating said spring both by vertical movement of said oscillating arm about its hinge support and by banking movement of the banking arm about the banking axis, the point of connection between said bell crank and said rod being offset from said oscillating hinge and from the banking axis to provide a leverage for said bell crank in operating the spring favorably to inward banking of the superstructure on turns.

28. A vehicle in which the superstructure is supported by cooperating pairs of banking arms for inward banking action on turns, the banking arms of each pair being interconnected and each banking arm of at least one pair of arms comprising an independent wheel suspension structure having a steerable wheel at its outer end carried by a spindle support, a hinge support pivotally connected to the superstructure on a skew banking axis of the overslung type, a pair of vertically spaced substantially horizontal oscillating arms pivotally connected to said hinge support on substantially horizontal axes at their inner ends and similarly pivotally connected to the spindle support at their outer ends, a coil spring interposed between one of said oscillating arms and the superstructure to be operated by the oscillation of said arms, and a bell crank lever disposed at one end of said spring and operatively connected to actuate the same, said lever and spring bridging said banking axis to thereby actuate the spring upon turn of the banking arm at said axis, whereby said spring is actuated both by vertical movement of said oscillating arms and by banking movement of said banking arm with the leverage thereagainst more favorable to banking movement of the banking arm than to oscillation of the oscillating arms under the influence of lateral forces on the superstructure.

29. A vehicle in which the superstructure is supported by cooperating pairs of banking arms for inward banking action on turns, the banking arms of each pair being interconnected and each banking arm of at least one pair of arms comprising an independent wheel suspension structure having a steerable wheel at its outer end carried by a spindle support, a hinge support pivotally connected to the superstructure on a skew banking axis of the overslung type, a pair of vertically spaced substantially horizontal oscillating arms pivotally connected to said hinge support on substantially horizontal axes at their inner ends and similarly pivotally connected to the spindle support at their outer ends, a coil spring supported by the lower oscillating arm, and a bell crank lever bridging said banking axis and having its outer end confining the upper end of said spring against upward movement, whereby said spring is actuated both by vertical movement of said oscillating arms and by banking movement of said banking arm with the leverage thereagainst more favorable to banking movement of the banking arm than to oscillation of the oscillating arms under the influence of lateral forces on the superstructure.

30. A vehicle in which the superstructure is supported by cooperating pairs of banking arms for inward banking action on turns, the banking arms of each pair being interconnected and each banking arm of at least one pair of arms comprising an independent wheel suspension structure having a steerable wheel at its outer end carried by a spindle support, a hinge support pivotally connected to the superstructure on a skew banking axis of the overslung type, a pair of vertically spaced substantially horizontal oscillating arms pivotally connected to said hinge support on substantially horizontal axes at their inner ends and similarly pivotally connected to the spindle support at their outer ends, a coil spring supported by the lower oscillating arm, a bell crank lever pivotally carried by the superstructure with a horizontally outwardly disposed arm confining the upper end of said spring against upward movement, and a link connecting a downwardly extending arm of said bell crank lever to said hinge support, whereby said spring is actuated both by vertical movement of said oscillating arms and by banking movement of said banking arm with the leverage thereagainst more favorable to banking movement of the banking arm than to oscillation of the oscillating arms under the influence of lateral forces on the superstructure.

31. A vehicle comprising a superstructure, a pair of banking arms pivotally connected to the superstructure on opposite sides of the front end thereof on corresponding correlated skew banking axes for said arms, each arm embodying a steerable wheel at its outer end providing a road contact point for the arm, and a pair of vertically spaced substantially horizontally disposed oscillating arms disposed to support said wheel for vertical oscillation relative to the superstructure and serving to control the position of the wheel in turning, a tie rod connecting said pair of banking arms to provide substantially independent vertical movement for said wheels and to effect correlated banking action of the banking arms, a spring for each banking arm disposed between one of said oscillating arms and the superstructure to be operated both by the vertical oscillation of the wheel and by a turn of the banking arm at the banking axis, and a bell crank lever bridging the banking axis and serving to support the spring relative to the superstructure, said bell crank lever being disposed to actuate the spring by relative turn between the banking arm and the superstructure at the banking axis, a pair of banking arms pivotally connected to the superstructure on opposite sides of the rear end thereof on corresponding correlated skew banking axes for said arms and having their outer ends connected to a rigid axle structure by universally movable joints constituting effective road contact points for the arms, wheels at the outer ends of said axle structure, each of said rear end banking arms embodying a vertically oscillating arm for vertical oscillation of the axle structure relative to the superstructure, an upper suspension rod connecting the axle structure to the superstructure to prevent turning of the axle structure, a spring for each banking arm disposed between said oscillating arm and the superstructure to be operated both by the vertical oscillation of the axle structure and by a turn of the banking arm at the banking axis, and a bell crank lever on said oscillating arm and interposed between the same and said spring to provide a leverage for actuating the spring, the banking arms at the front and rear of said superstructure being correlated to effect inward banking of the superstructure on turns and the oscillation arms being correlated to provide for separate substantially vertical oscillation of each wheel relative to the substantially common plane of the other wheels.

32. A vehicle comprising a superstructure and front and rear wheels, wheel carriers for said wheels hinged to the superstructure on hinge axes each of which is inclined toward the longitudinal median plane of the vehicle, each of the front wheel carriers comprising upper and lower suspension arms swingable about horizontal axes and a spring connecting the carrier to the superstructure and so related to the carrier and superstructure as to be increasingly stressed as the vehicle load is increased and as the carrier swings laterally about its associated hinge axis in a direction toward said median plane.

33. A vehicle comprising a superstructure and front and rear wheels, wheel carriers for said wheels hinged to the superstructure on hinge axes each of which is inclined toward the longitudinal median plane of the vehicle, each of the front wheel carriers comprising upper and lower suspension arms swingable about horizontal axes and a spring connecting the carrier to the superstructure and so related to the carrier and superstructure as to be increasingly stressed as the vehicle load is increased and as the carrier swings laterally about its associated hinge axis in a direction toward said median plane, and wherein each of the rear wheel carriers comprises a suspension arm swingable about a horizontal axis and a spring connecting the carrier to the superstructure and so related to the carrier and superstructure as to be increasingly stressed as the vehicle load is increased and as the carrier swings laterally about its associated hinge axis in a direction toward said median plane.

34. A vehicle comprising a superstructure and paired front and rear wheels, a wheel carrier for each of said wheels hinged to the superstructure on a hinge axis which is inclined toward the median plane of the vehicle and toward the wheel with which the carrier is associated, each of the front wheel carriers comprising upper and lower suspension arms swingable about horizontal axes, each of the rear wheel carriers comprising a suspension arm swingable about a horizontal axis, and a spring connecting each carrier to the superstructure and so related to the carrier and superstructure as to be increasingly stressed as the carrier swings inwardly about its associated hinge axis, wherein the spring is also so related to the carrier and to the superstructure to be increasingly stressed as the vehicle load is increased.

35. In a vehicle of the class described, a superstructure, a plurality of pairs of wheels for supporting the same with the wheels of each pair spaced laterally apart on opposite sides of the superstructure, a wheel carrier for each wheel connected to the superstructure to pivot on a banking axis for the same and tied to the opposite wheel carrier for the corresponding pair of wheels, means providing for vertical oscillation of each wheel carrier relative to the superstructure, and a single resilient means connecting each wheel carrier and the superstructure to control the vertical oscillation of the corresponding wheel carrier and its rotational movement upon the corresponding banking axis, the banking axes for each pair of wheels being correlated to intersect in the longitudinal vertical median plane of the superstructure at a point sufficiently high to provide for inward banking of the superstructure on turns and sufficiently low to reduce the lateral movement of the superstructure necessary to obtain a given banking movement thereof.

36. In a vehicle embodying a superstructure supported by a plurality of wheels arranged in pairs with the wheels of each pair disposed on opposite sides of the superstructure, separate resilient cushion means disposed between the superstructure and the supporting wheels therefor providing for vertical support of the corresponding opposite sides of the superstructure and for vertical oscillation of the wheels relative to the superstructure, means disposed to provide limited lateral movement of the superstructure relative to the wheels in response to centrifugal forces on turns, means interconnecting the cushion means for each pair of wheels to maintain the distance between the wheels substantially constant, lever means disposed at one end of each said cushion means to actuate the same during vertical oscillation of the corresponding wheel relative to the superstructure, lever means carried by said superstructure and connected to the opposite end of each said cushion means to support the same against the actuation thereof by said first named lever means, and means to actuate said last named lever means directly in response to said lateral movement of the superstructure and in a direction to adjust the corresponding wheel position vertically relative to the superstructure to substantially compensate for the tendency of the superstructure to yield its vertical position upon said cushion means during banking.

37. In an inward banking vehicle employing articulated wheel carriers between the superstructure and the supporting wheels therefor which embody resilient cushion means providing for vertical support of the superstructure and vertical oscillation of the wheels relative to the superstructure, means interconnecting the wheel carriers of each pair thereof transversely of the superstructure to maintain spacing of the corresponding wheels substantially constant, means disposed to provide for lateral movement of the superstructure relative to the wheels in response to centrifugal forces on turns, lever means disposed at one end of each said cushion means to actuate the same in response to articulation of the corresponding wheel carrier upon vertical oscillation of the wheel carrier relative to the superstructure, lever means carried by said superstructure and connected to the opposite end of each said cushion means to support the same against the actuation thereof by said first named lever means, and means to actuate said last named lever means directly in response to said lateral movement of the superstructure and in a direction to maintain the length of said wheel carriers substantially constant during banking.

JOACHIM KOLBE.

References Cited in the file of this patent

UNITED STATES PATENTS

| Number | Name | Date |
| --- | --- | --- |
| 2,186,065 | Fischer | Jan. 9, 1940 |
| 2,279,120 | Hurley | Apr. 7, 1942 |
| 2,280,044 | Kolbe | Apr. 14, 1942 |
| 2,341,726 | Kolbe | Feb. 15, 1944 |
| 2,349,175 | Kolbe | May 16, 1944 |
| 2,576,686 | Kolbe | Nov. 27, 1951 |